United States Patent
Reed et al.

[19]

[11] Patent Number: 5,822,456
[45] Date of Patent: Oct. 13, 1998

[54] OPTIMAL SPLINE INTERPOLATION FOR IMAGE COMPRESSION

[75] Inventors: Irving S. Reed, Santa Monica; Alfred C. Yu, Irvine, both of Calif.

[73] Assignee: Johnson-Grace, Newport Beach, Calif.

[21] Appl. No.: 275,945

[22] Filed: Jul. 14, 1994

[51] Int. Cl.$^6$ ....................................................... G06K 9/36
[52] U.S. Cl. ............................................ 382/232; 382/260
[58] Field of Search ................................ 382/232, 233, 382/248, 276, 279, 280, 260, 240; 348/403, 408, 384; 358/426, 428; 375/240; 364/715.02; 345/202

[56] References Cited

U.S. PATENT DOCUMENTS

| | | | |
|---|---|---|---|
| 4,122,440 | 10/1978 | Langdon, Jr. et al. | 340/347 |
| 4,467,317 | 8/1984 | Langdon, Jr. et al. | 340/347 |
| 4,891,643 | 1/1990 | Mitchell et al. | 341/107 |
| 4,897,717 | 1/1990 | Hamilton et al. | 358/133 |
| 4,905,297 | 2/1990 | Langdon, Jr. et al. | 382/56 |
| 4,922,508 | 5/1990 | Moriya | 375/34 |
| 5,157,488 | 10/1992 | Pennebaker | 358/133 |
| 5,168,375 | 12/1992 | Reisch et al. | 358/432 |
| 5,189,526 | 2/1993 | Sasson | 358/432 |
| 5,196,946 | 3/1993 | Balkanski et al. | 358/433 |
| 5,262,878 | 11/1993 | Esserman | 358/453 |
| 5,270,832 | 12/1993 | Balkanski et al. | 358/432 |
| 5,299,025 | 3/1994 | Shirasawa | 358/400 |
| 5,317,411 | 5/1994 | Yoshida | 358/261.2 |
| 5,325,125 | 6/1994 | Naimpally et al. | 348/402 |

OTHER PUBLICATIONS

Schumaker. "Spline Functions: Basic Theory". John Wiley & Sons, pp. 484–500, 1981.

Mannheim. "On Interpolation by Generalized Planar Splines I: The Polynomial Case." Computing, vol. 42, pp. 187–194, 1989.

Lee et al. "Image Surface Approximation with Irregular Samples." IEEE Transactions on Pattern Analysis and Machine Intelligence, vol. 11, No. 2, pp. 206–212, 1989.

Caputo et al. "A Multiresolution Technique for 3–D Image Compression." Proc. 1993 IEEE 19th Annual Northeast Bioengineering Conf., pp. 45–46, Mar. 1993.

Daehlen et al. "Iterative Polynomial Interpolation and Data Compression." Numerical Algorithms, vol.5, pp. 165–177, 1993.

Daehlen, "Modeling with Box Spline Surfaces," Curve and Surface Design, 1992.

Kitson, "An Algorithm for Curve and Surface Fitting Using B–Splines," ICASSP–89, vol.2 pp. 1207–1210, 1989.

Lu et al., "Optimal Local Spline Approximation of Planar Shape," ICASSP 91, vol.4, pp. 2469–2472, 1991.

Unser et al. "B–Spline Signal Processing: Part I and II", IEEE Transactions on Signal Processing, vol. 41, No. 2, pp. 821–848.

*Primary Examiner*—Jon Chang
*Attorney, Agent, or Firm*—Fish & Richardson P.C.

[57] ABSTRACT

A computationally fast, effective method for compressing digital images uses an optimized subsampling process. A set of spatially overlapping spline functions is used as a basis onto which the image data are projected by use of a least-mean-squares criterion. The specified processes can be implemented for compressing and interpolating digital data arrays of N dimensions. Linear, planar and hyperplanar spline functions allow convenient, fast and efficient closed-form optimal compression, which process is easily incorporated into existing digital processing systems. A key advantage of the disclosed method is the fast coding/reconstruction speed, because it involves only FFT or convolution types of processors.

6 Claims, 29 Drawing Sheets

IMAGE DOMAIN

3x3 FILTER KERNEL

5x5 FILTER KERNEL

7x7 FILTER KERNEL

ORIGINAL

OPTIMIZED WEIGHTS

OPTIMIZED WEIGHTS

OPTIMAL SPLINE INTERPOLATION FOR IMAGE COMPRESSION

FIELD OF THE INVENTION

The invention pertains generally to methods for digital data compression. In particular, the invention relates to fast optimal interpolation methods for sound, image and video data compression.

BACKGROUND OF THE INVENTION

Image and sound may in general be transmitted, stored and displayed using multi-dimensional arrays of digital data, most often pertaining to sound (time domain), still images (2-dimensional spatial domain) or video (3-dimensional space-time domain). Digital representations of images, which in general include sound and image sequences, require substantial amounts of digital storage capacity or large transmission bandwidths. Broadly stated, the goal of digital image coding is primarily to reduce this data volume, while at the same time retaining a faithful duplicate of the original image. Compression methods for image data are based on redundancies in data and on the non-linearities of human perception (e.g., vision and hearing). In the case of still images, spatial correlation is usually exploited, while for video, correlation in time and space are utilized. Because of its practical significance, digital image coding is an active area of research and development both academically and in industry.

Historically, there are a variety of approaches to the problem of image compression, which may be classified by virtue of their predominant encoding algorithms, such as, for example, predictive coding, transform coding, statistical coding and interpolation coding. Contemporary image compression systems often utilize a combination of coding techniques tailored to the characteristics of the image. For instance, the Joint Photographic Experts Group (JPEG) standard utilizes Discrete Cosine Transform (DCT) and Huffman statistical coding among others.

In order to reduce the computational overhead associated with a large image during image processing, decimation or subsampling can be performed at the outset, reducing the number of samples in subsequent processing. However, it is well known that the data should be filtered in conjunction with subsampling to reduce aliasing upon reconstruction. This decimation filtering is low pass in nature. It reduces the potential aliasing effect associated with resampling, but it also reduces the resolution of the original image. In the reconstruction process, these compressed data are interpolated by a corresponding inverse process to form the final image, for example, by a 1st-order bi-linear interpolation. Combining the effect of low pass filtering, decimation and interpolation, the resolution of the resulting image is reduced. A way of retaining the initial resolution is to add back the difference, or residue, to the reconstructed image; however, the residue derived by simply subtracting the reconstructed image from the original is generally quite large, hence limiting the resulting data compression.

Given the transmission, display and storage requirements of digital multimedia, more efficient data compression methods are clearly in demand. Conventional decimation/interpolation methods suffer from being computationally intensive and/or inefficient compared to the present invention.

SUMMARY OF THE INVENTION

One objective of the present invention is to provide an optimal filter for decimation/interpolation of digital data which produces a minimal amount of residual error when comparing the reconstructed data to the original data set.

Another object of the present invention is to provide a simple, efficient method for substantially minimizing the residual image associated with a digital data subsampling process.

Accordingly, one aspect of the present invention comprises a method of compressing and reconstructing digital data which includes applying spline filters to the original digital data to generate compressed digital data. An optimizing process utilizes a predetermined error criterion to generate substantially optimal compressed digital data. A preferred error criterion is, for example, a least-mean-squares constraint. The method further entails interpolating the substantially optimal compressed digital data to generate a reconstructed representation of the original digital data.

According to another aspect of the present invention, an optimal method for compressing digital data comprises applying spline filters to the digital data to generate compressed digital data. The compressed digital data is optimized by applying a predetermined error criterion to generate substantially optimal compressed digital data. A predetermined error criterion preferably incorporates the influence of the spline filter on the original digital data.

According to still another aspect of the present invention, a method of approximating an array of digital data comprises periodically subsampling the array of digital data using a set of sampled continuous functions. The subsampling process generates an approximation of the original digital data comprising a weighted combination of the sampled continuous functions. The weighted combination of sampled continuous functions is optimized by a predetermined error criterion, preferably a least-mean-squares criterion.

A further aspect of the present invention comprises a method of optimizing an N-dimensional array of periodically subsampled digital data. The method comprises estimating a correlation tensor which characterizes a subsampling process, and estimating the inverse of the correlation tensor. The periodically subsampled N-dimensional array of digital data is optimized by a convolution process involving the estimated inverse of the correlation tensor.

DETAILED DESCRIPTION OF THE PREFERRED EMBODIMENT

A novel optimal decimation/interpolation method is disclosed for multi-dimensional image data coding. The principle of operation derives from a least-mean-square error (LMS)-error spline approach, which is extendable to N dimensions. One- and two-dimensional image data compression utilizing linear and planar splines, respectively, are shown to have compact, closed-form optimal solutions for convenient, effective compression. The computational efficiency of this new method is of special interest, because the compression/reconstruction algorithms proposed herein involve only the Fast Fourier Transform (FFT) and inverse FFT types of processors or other high-speed direct convolution algorithms. Thus, the compression and reconstruction from the compressed image can be extremely fast and realized in existing hardware and software. Even with this high computational efficiency, good image quality is obtained upon reconstruction. An important and practical consequence of the disclosed method is the convenience and versatility with which it is integrated into a variety of hybrid digital data compression systems.

I. SPLINE FILTER OVERVIEW

Figure 1:
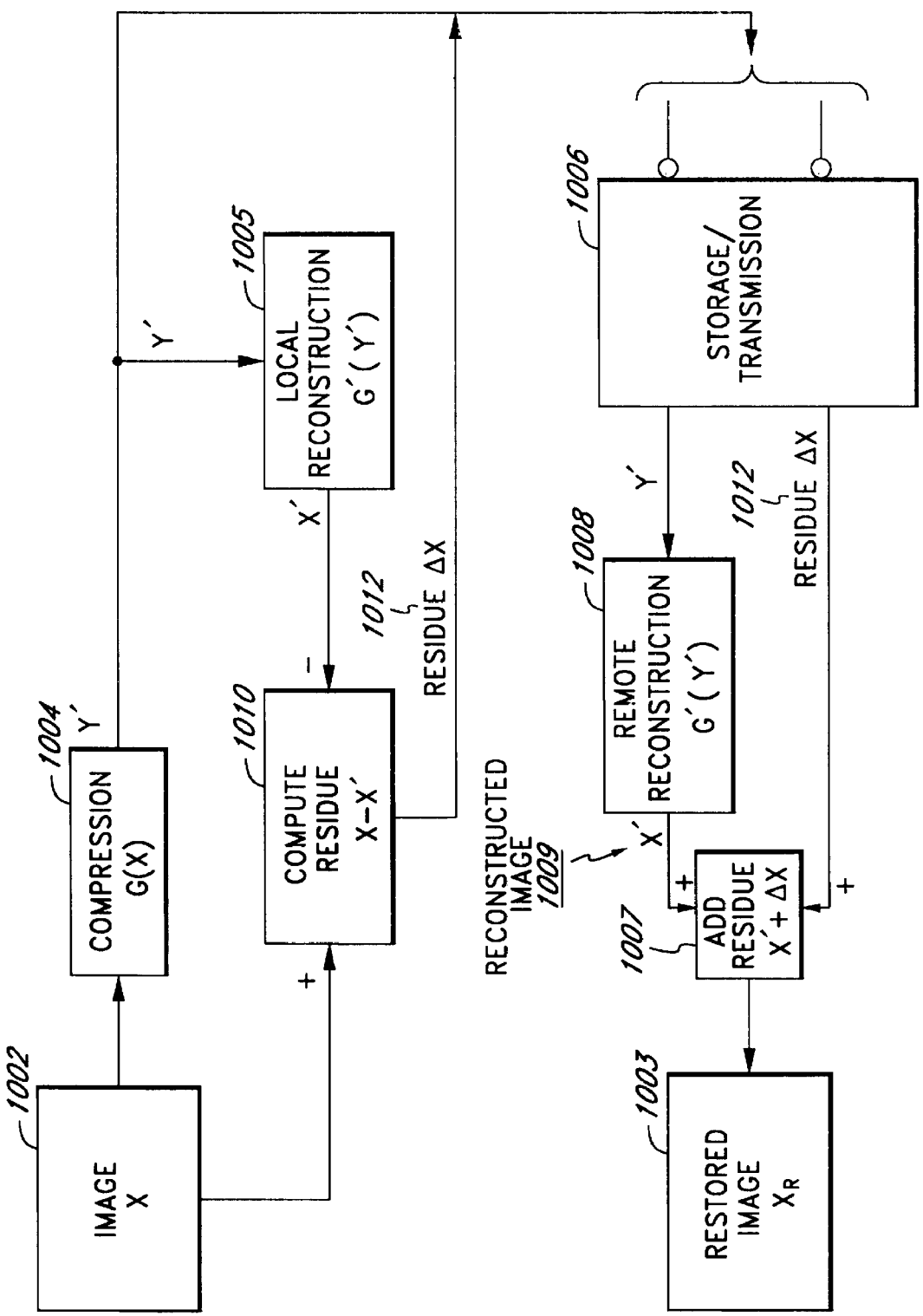
FIG. 1 is a basic block diagram of image data compression.

The basic process of digital image coding entails transforming a source image X into a "compressed" image Y such that the signal energy of Y is concentrated into fewer elements than the signal energy of X, with some provisions regarding error. As depicted in FIG. 1, digital source image data 1002 represented by an appropriate N-dimensional array X is supplied to compression block 1004, whereupon image data X is transformed to compressed data Y' via a first generalized process represented here as G(X)=Y'. Compressed data may be stored or transmitted (process block 1006) to a "remote" reconstruction block 1008, whereupon a second generalized process, G'(Y')=X', operates to transform compressed data Y' into a reconstructed image X'.

G and G' are not necessarily processes of mutual inversion, and the processes may not conserve the full information content of image data X. Consequently, X' will, in general, differ from X, and information is lost through the coding/reconstruction process. The residual image or so-called residue is generated by supplying compressed data Y' to a "local" reconstruction process 1005 followed by a difference process 1010 which computes the residue $\Delta X=X-X'$ 1012. Preferably, X and X' are sufficiently close, so that the residue $\Delta X$ 1012 is small and may be transmitted, stored along with the compressed data Y', or discarded. Subsequent to the remote reconstruction process 1008, the residue $\Delta X$ 1012 and reconstructed image X' are supplied to adding process 1007 to generate a restored image $X'+\Delta X= X''$ 1003.

Figure 2:
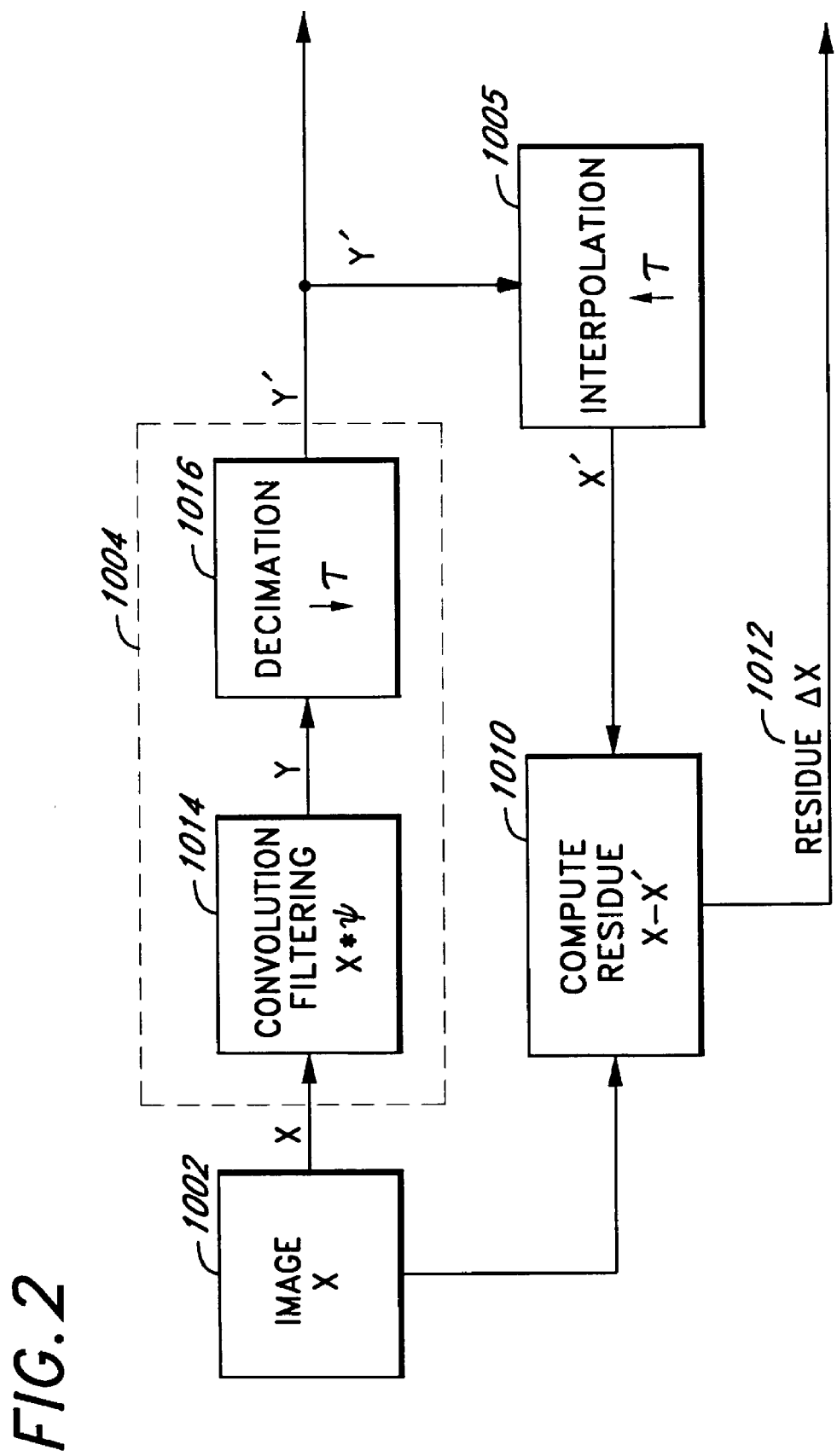
FIG. 2 is a basic block diagram of a spline decimation/interpolation filter.

In practice, to reduce computational overhead associated with large images during compression, a decimating or subsampling process may be performed to reduce the number of samples. Decimation is commonly characterized by a reduction factor $\tau$ (tau), which indicates a measure of image data elements to compressed data elements. However, one skilled in the art will appreciate that image data X must be filtered in conjunction with decimation to avoid aliasing. As shown in FIG. 2, a low-pass input filter may take the form of a pointwise convolution of image data X with a suitable convolution filter 1014, preferably implemented using a matrix filter kernel. A decimation process 1016 then produces compressed data Y', which is substantially free of aliasing prior to subsequent process steps. While the convolution or decimation filter 1014 attenuates aliasing effects, it does so by reducing the number of bits required to represent the signal. It is "low-pass" in nature, reducing the information content of the reconstructed image X'. Consequently, the residue $\Delta X$ 1012 will be larger, and in part, will offset the compression attained through decimation.

Figure 3:
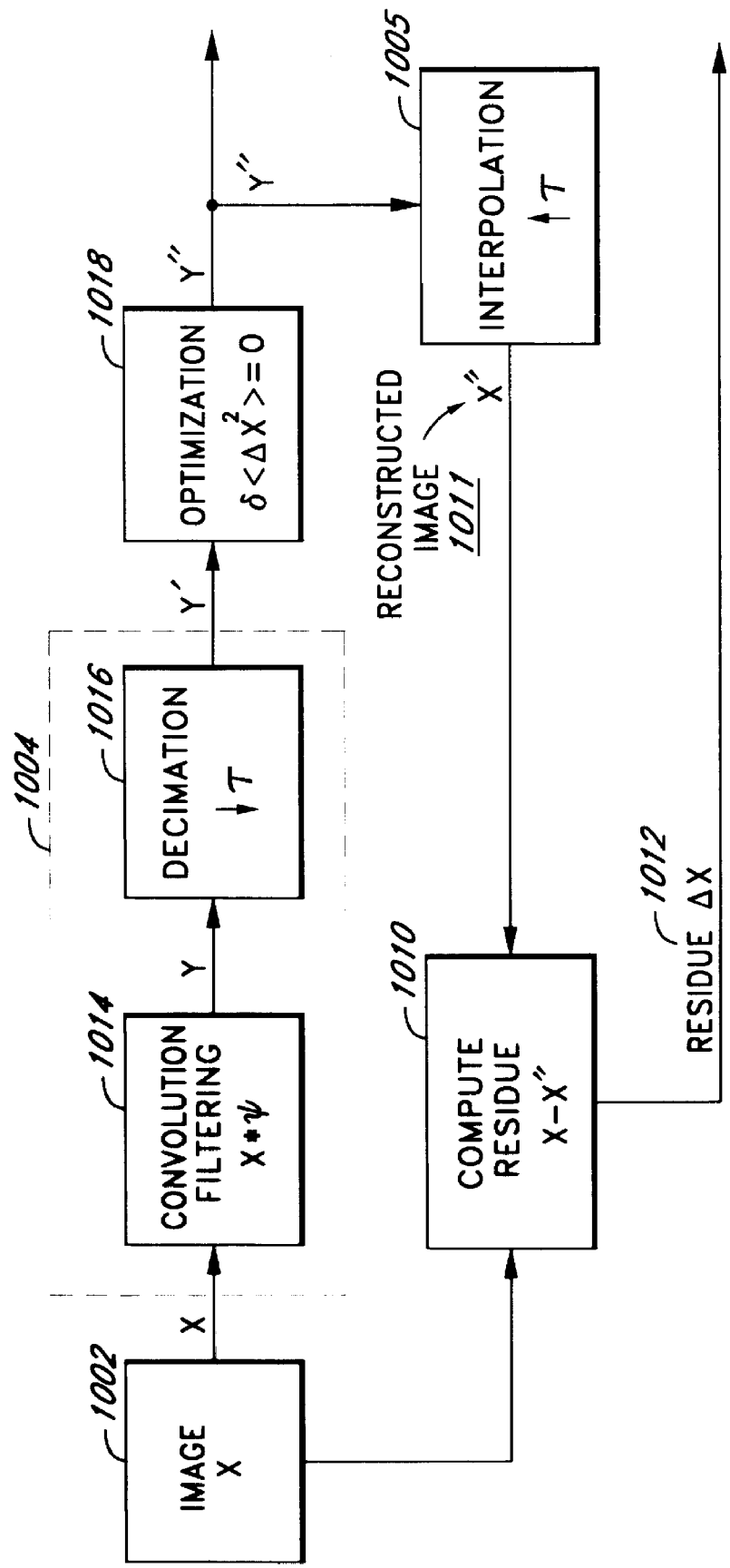
FIG. 3 is a basic block diagram of an optimal spline filter.

The present invention disclosed herein solves this problem by providing a method of optimizing the compressed data such that the mean-square-residue $<\Delta X^2>$ is minimized, where "<>" shall herein denote an averaging process. As shown in FIG. 3, compressed data Y', generated in a manner similar to that shown in FIG. 2, is further processed by an optimization process 1018. Accordingly, the optimization process 1018 is dependent upon the properties of convolution filter 1014 and is constrained such that the variance of the mean-square-residue is zero, $\delta<\Delta X^2>=0$. The disclosed method of filter optimization "matches" the filter response to the image data, thereby minimizing the residue. Since the decimation filter 1014 is low-pass in nature, the optimization process 1018, in part, compensates by effectively acting as a "self-tuned" high-pass filter. A brief descriptive overview of the optimization procedure is provided in the following sections.

A. Image Approximation by Spline Functions

As will become clear in the following detailed description, the input decimation filter 1014 of FIG. 3 may be regarded as a projection of an image data vector X onto a set of basis functions that constitute shifted, but overlapping, spline functions $\{\Psi_k(X)\}$ such that $$\underline{X} \approx \underline{X}' = \sum_k \chi_k \Psi_k(\underline{x}),$$

where X' is the reconstructed image vector and $X_k$ is the decomposition weight. The image data vector X is thus approximated by an array of preferably computationally simple, continuous functions, such as lines or planes, allowing also an efficient reconstruction of the original image.

According to the method, the basis functions need not be orthogonal and are preferably chosen to overlap in order to provide a continuous approximation to image data, thereby rendering a non-diagonal basis correlation matrix:

$$A_{jk}=\Psi_j(X)\cdot\Psi_k(X).$$

This property is exploited by the method of the present invention, since it allows the user to "adapt" the response of the filter by the nature and degree of cross-correlation. Furthermore, the basis of spline functions need not be complete in the sense of spanning the space of all image data, but preferably generates a close approximation to image X. It is known that the decomposition of image vector X into components of differing spline basis functions $\{\Psi_k(X)\}$ is not unique. The method herein disclosed optimizes the projection by adjusting the weights $X_k$ such that the differential variations of the average residue vanishes, $\delta<\Delta X^2>=0$, or equivalently $<\Delta X^2>=$min. In general, it will be expected that a more complete basis set will provide a smaller residue and better compression, which, however, requires greater computational overhead and greater compression. Accordingly, it is preferable to utilize a computationally simple basis set, which is easy to manipulate in closed form and which renders a small residual image. This residual image or residue $\Delta X$ is preferably retained for subsequent processing or reconstruction. In this respect there is a compromise between computational complexity, compression, and the magnitude of the residue.

Figure 4:
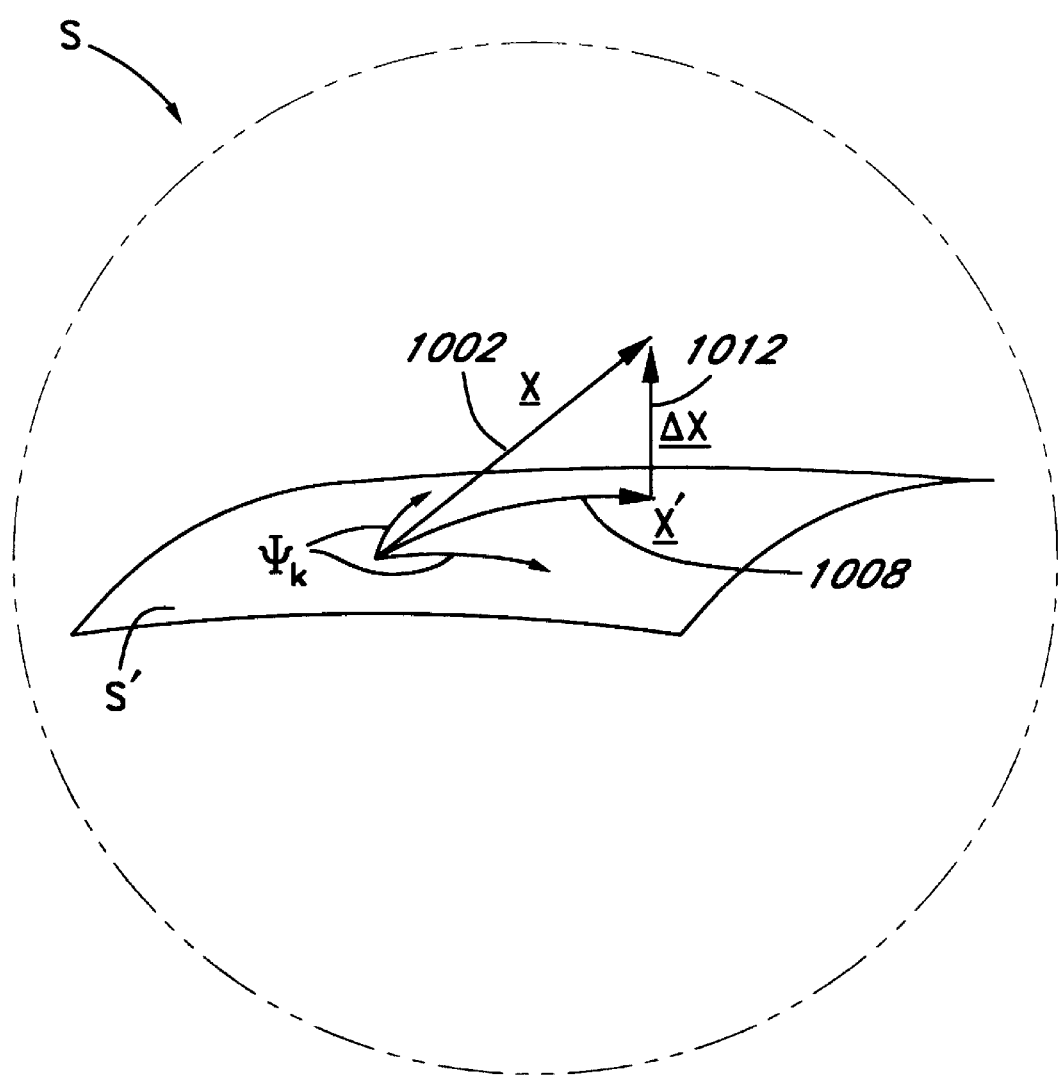
FIG. 4 is a vector representation of the image, processed image, and residual image.

In a schematic view, a set of spline basis functions $S'=\{\Psi_k\}$ may be regarded as a subset of vectors in the domain of possible image vectors $S=\{X\}$, as depicted in FIG. 4. The decomposition on projection of X onto components of S' is not unique and may be accomplished in a number of ways. A preferable criterion set forth in the present description is a least-mean-square (LMS) error, which minimizes the overall difference between the source image X and the reconstructed image X'. Geometrically, the residual image $\Delta X$ can be thought of as a minimal vector in the sense that it is the shortest possible vector connecting X to X'. That is, $\Delta X$ might, for instance, be orthogonal to the subspace S', as shown in FIG. 4. As it will be elaborated in the next section, the projection of image vector X onto S' is approximated by an expression of the form:

$$\underline{X} \approx \underline{X}' = \sum_k \chi_k \Psi_k(\underline{x})$$

The "best" X' is determined by the constraint that $\Delta X=X-X'$ is minimized with respect to variations in the weights $X_j$:

$$\frac{\partial}{\partial \chi_j}<\Delta\underline{x}^2> = \frac{\partial}{\partial \chi_j}\left\langle \left(\underline{X} - \sum_k \chi_k \Psi_k(\underline{x})\right)^2 \right\rangle = 0,$$

which by analogy to FIG. 4, described an orthogonal projection of X onto S'.

Generally, the above system of equations which determines the optimal $X_k$ may be regarded as a linear transformation, which maps X onto S' optimally, represented here by:

$$A(\chi_k)=X*\Psi_k(X),$$

where $A_{ij}=\Psi_i*\Psi_j$ is a transformation matrix having elements representing the correlation between bases vectors $\Psi_i$ and $\Psi_j$. The optimal weights $X_k$ are determined by the inverse operation $A^{-1}$:

$$\chi_k=A^{-1}(X*\Psi_k(X)),$$

rendering compression with the least residue. One skilled in the art of LMS criteria will know how to express the processes given here in the geometry of multiple dimensions. Hence, the processes described herein are applicable to a variety of image data types.

The present brief and general description has direct processing counterparts depicted in FIG. 3. The operation $$X*\Psi_k(X)$$

represents a convolution filtering process 1014, and $$A^{-1}(X*\Psi_k(X))$$

represents the optimizing process 1018.

In addition, as will be demonstrated in the following sections, the inverse operation $A^{-1}$ is equivalent to a so-called inverse eigenfilter when taken over to the conjugate image domain. Specifically, $$DFT\chi_k = \frac{1}{\lambda_m} DFT(\underline{X} \cdot \Psi_k(\underline{x})),$$

where DFT is the familiar discrete Fourier transform (DFT) and $\lambda_m$ are the eigenvalues of A. The equivalent optimization block 1018, shown in FIG. 5, comprises three steps: (1) a discrete Fourier transformation (DFT) 1020; (2) inverse eigenfiltering 1022; and (3) an inverse discrete Fourier transformation ($DFT^{-1}$) 1024. The advantages of this embodiment, in part, rely on the fast coding/reconstruction speed, since only DFT and $DFT^{-1}$ are the primary computations, where now the optimization is a simple division. Greater elaboration into the principles of the method are provided in Section II where also the presently contemplated preferred embodiments are derived as closed form solutions for a one-dimensional linear spline basis and two-dimensional planar spline bases. Section III provides an operational description for the preferred method of compression and reconstruction utilizing the optimal procedure disclosed in Section II. Section IV discloses results of a reduction to practice of the preferred embodiments applied to one- and two-dimensional images. Finally, Section V discloses a preferred method of the filter optimizing process implemented in the image domain.

II. IMAGE DATA COMPRESSION BY OPTIMAL SPLINE INTERPOLATION

A. One-Dimensional Data Compression by LMS-Error Linear Splines

Figure 6:
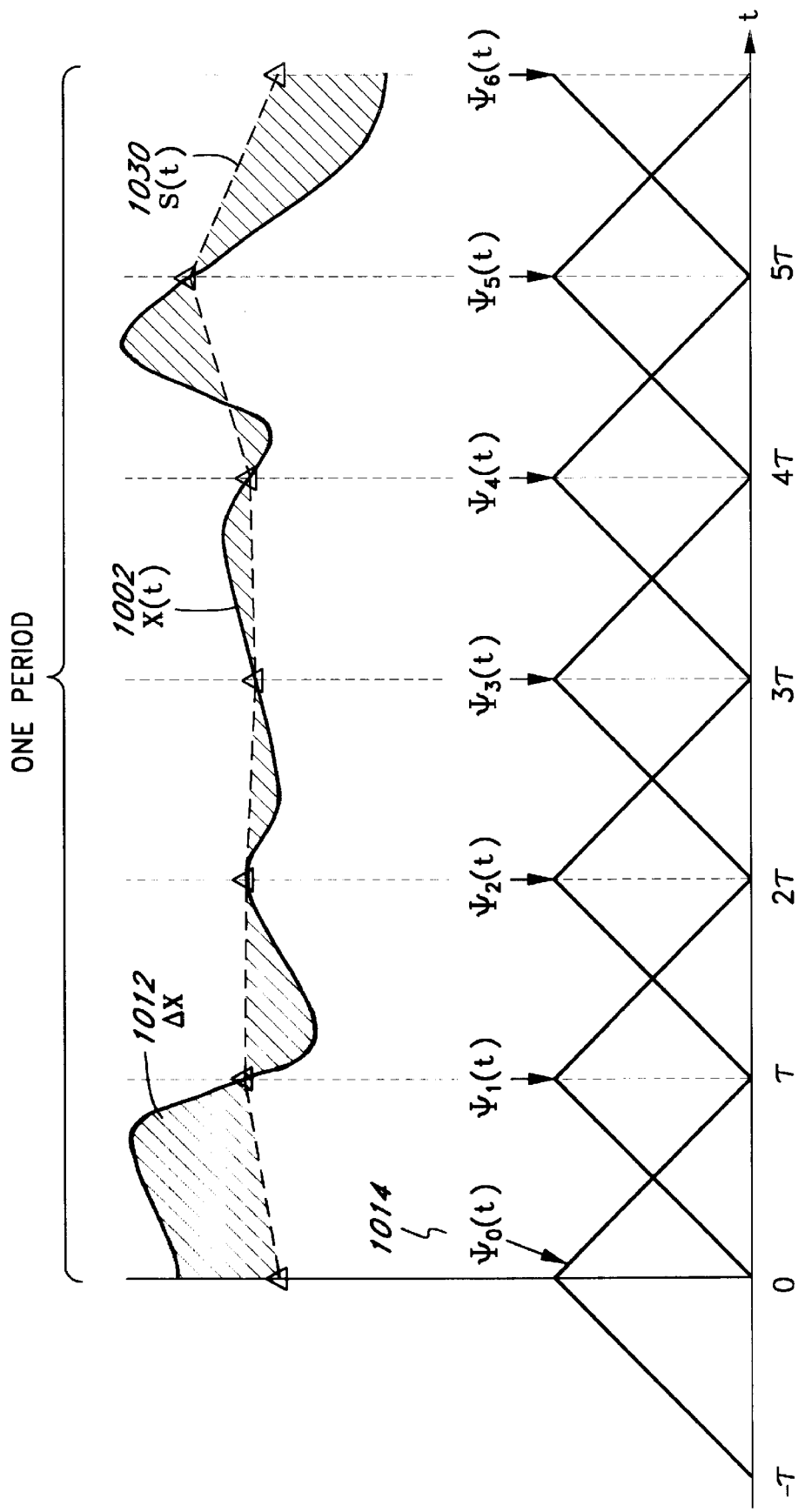
FIG. 6 is a graphical illustration of a one-dimensional bi-linear spline projection.

For one-dimensional image data, bi-linear spline functions are combined to approximate the image data with a resultant linear interpolation, as shown in FIG. 6. The resultant closed-form approximating and optimizing process has a significant advantage in computational simplicity and speed.

Letting the decimation index $\tau$ and image sampling period t be fixed, positive integers $\tau,t=1,2,\ldots$, and letting X(t) be a periodic sequence of data of period $n\tau$, where n is also an integer, consider a periodic, linear spline 1014 of period $n\tau$ of the type, $$F(t)=F(t+n\tau), \qquad (1)$$

where $$F(t) = \begin{cases} 1 - \frac{|t|}{\tau} & \text{for } |t| \leq \tau \\ 0 & \text{for } |t| > \tau, \end{cases} \qquad (2)$$

as shown by the functions $\Psi_k(t)$ 1014 of FIG. 6.

The family of shifted linear splines F(t) is defined as follows:

$$\psi_k=F(t-k\tau) \text{ for } (k=0,1,2,\ldots,(n-1)). \qquad (3)$$

One object of the present embodiment is to approximate X(t) by the n-point sum:

$$S(t) = \sum_{k=0}^{n-1} X_k \Psi_k(t), \quad (4)$$

in a least-mean-squares fashion where $X_0, \ldots, X_{n-1}$ are n reconstruction weights. Observe that the two-point sum in the interval $0 < t < \tau$ is:

$$X_0 \Psi_0(t) + X_1 \Psi_1(t) = X_0 \left(1 - \frac{t}{\tau}\right) + X_1 \left(1 - \frac{|t-\tau|}{\tau}\right) \quad (5)$$

$$= X_0 + (X_1 - X_0) \frac{t}{\tau}$$

Hence, S(t) 1030 in Equation 4 represents a linear interpolation of the original waveform X(t) 1002, as shown in FIG. 6.

To find the "best" weights $X_0, \ldots, X_{n-1}$, the quality $L(X_0, X_1, \ldots, X_{n-1})$ is minimized:

$$L(X_0, X_1, \ldots, X_{n-1}) = \sum_{t=-\tau}^{n\tau} \left\langle \left( X(t) - \sum_{k=0}^{n-1} X_k \Psi_k(t) \right)^2 \right\rangle, \quad (6)$$

where the sum has been taken over one period plus $\tau$ of the data. $X_k$ is minimized by differentiating as follows:

$$\frac{\partial L}{\partial X_j} = \sum_{t=\tau}^{n\tau} 2 \left( X(t) - \sum_{k=0}^{n-1} X_k \Psi_k(t) \right) \Psi_j(t) \quad (7)$$

$$= \left\langle 2 \left( \sum_{t=-\tau}^{n\tau} X(t) \Psi_j(t) - \sum_{k=0}^{n-1} X_k \sum_{t=-\tau}^{n\tau} \Psi_k(t) \Psi_j(t) \right) \right\rangle \equiv 0.$$

This leads to the system, $$\sum_{k=0}^{n-1} A_{jk} X_k = Y_j, \quad (8)$$

of linear equations for $X_k$, where $$A_{jk} = \sum_{t=-\tau}^{n\tau} \Psi_j(t) \Psi_k(t) \text{ for } (j, k = 0, 1, \ldots, n-1) \quad (9)$$

and $$Y_j = \sum_{t=-\tau}^{n\tau} X(t) \Psi_j(t) \text{ for } (j = 0, 1, \ldots, n-1) \quad (10)$$

The term $Y_j$ in Equation 10 is reducible as follows:

$$Y_j = \sum_{t=-\tau}^{n\tau} X(t) F(t - j\tau) \quad (11)$$

$$= \sum_{t=(j-1)\tau}^{(j+1)\tau} X(t) F(t - j\tau).$$

Letting $(t - j\tau) = m$, then:

$$Y_j = \sum_{m=-\tau+1}^{\tau-1} X(m + j\tau) F(m) \text{ for } (j = 0, 1, 2, \ldots, n-1). \quad (12)$$

The $Y_j$'s in Equation 12 represent the compressed data to be transmitted or stored. Note that this encoding scheme involves n correlation operations on only $\tau-1$ points.

Since F(t) is assumed to be periodic with period $n\tau$, the matrix form of $A_{jk}$ in Equation 9 can be reduced by substitution Equation 3 into Equation 9 to obtain:

$$A_{jk} = \sum_{m=-\tau+1}^{\tau-1} F(m + (j-k)\tau) F(m) \quad (13)$$

$$= \begin{cases} \sum_{m=-\tau+1}^{\tau-1} (F(m))^2 \triangleq \alpha & \text{if } j - k \equiv 0 \bmod n \\ \sum_{m=-\tau+1}^{\tau-1} F(m \pm \tau) F(m) \triangleq \beta & \text{if } j - k \equiv \pm 1 \bmod n \\ 0 & \text{otherwise} \end{cases}$$

By Equation 13, $A_{jk}$ can be expressed also in circulant form in the following manner:

$$A_{jk} = a_{(k-j)n}, \quad (14)$$

where $(k-j)n$ denotes $(k-j) \bmod n$, and $$a_0 = \alpha, a_1 = \beta, a_2 = 0, \ldots, a_{n-1} = \beta \quad (15)$$

Therefore, $A_{jk}$ in Equations 14 and 15 has explicitly the following equivalent circulant matrix representations:

$$[A_{jk}] \triangleq \begin{bmatrix} A_{0,0} & A_{0,1} & \ldots & A_{0,n-1} \\ A_{1,0} & A_{1,1} & \ldots & A_{1,n-1} \\ \vdots & \vdots & & \vdots \\ A_{n-1,0} & A_{n-1,1} & \ldots & A_{n-1,n-1} \end{bmatrix} \quad (16)$$

$$= [\{a_{(k-j)n}\}]$$

$$\triangleq \begin{bmatrix} a_0 & a_1 & a_2 & \ldots & a_{n-1} \\ a_{n-1} & a_0 & a_1 & \ldots & a_{n-2} \\ a_{n-2} & a_{n-1} & a_0 & \ldots & a_{n-3} \\ \vdots & \vdots & \vdots & & \vdots \\ a_1 & a_2 & a_3 & \ldots & a_0 \end{bmatrix}$$

$$= \begin{bmatrix} \alpha & \beta & 0 & \ldots & \beta \\ \beta & \alpha & \beta & \ldots & 0 \\ 0 & \beta & \alpha & \ldots & 0 \\ \vdots & \vdots & \vdots & & \vdots \\ \beta & 0 & 0 & \ldots & \alpha \end{bmatrix}$$

One skilled in the art of matrix and filter analysis will appreciate that the periodic boundary conditions imposed on the data lie outside the window of observation and may be defined in a variety of ways. Nevertheless, periodic boundary conditions serve to simplify the process implementation by insuring that the correlation matrix $[A_{jk}]$ has a calculable inverse. Thus, the optimization process involves an inversion of $[A_{jk}]$ of which the periodic boundary conditions and consequent circulant character play a preferred role. It is also recognized that for certain spline functions, symmetry rendered in the correlation matrix allows inversion in the absence of periodic image boundary conditions.

B. Two-Dimensional Data Compression by Planar Splines

Figure 7:
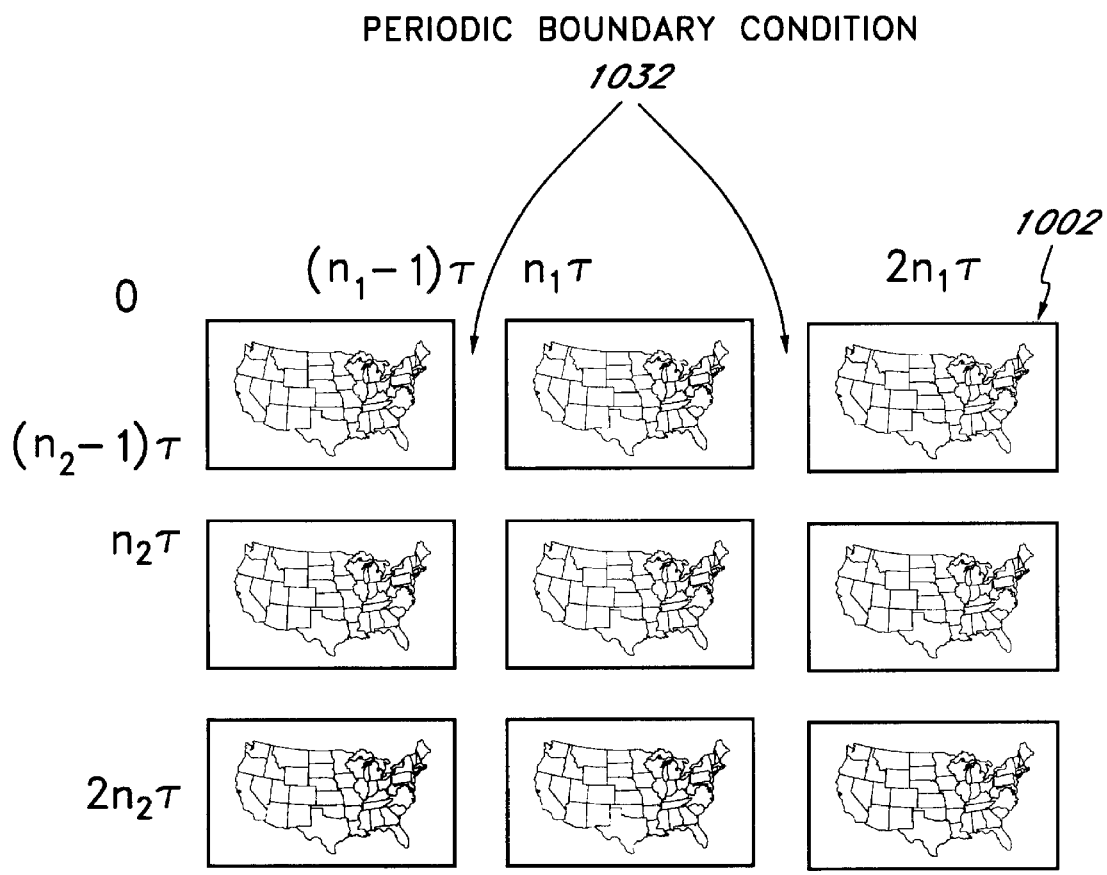
FIG. 7 is a schematic view showing periodic replication of a two-dimensional image.

For two-dimensional image data, multi-planar spline functions are combined to approximate the image data with a resultant planar interpolation. In FIG. 7, $X(t_1, t_2)$ is a doubly periodic array of image data (e.g., still image) of periods $n_1\tau$ and $n_2\tau$, with respect to the integer variables $t_1$ and $t_2$ where $\tau$ is a multiple of both $t_1$ and $t_2$. The actual image 1002 to be compressed can be viewed as being repeated periodically throughout the plane as shown in the FIG. 7. Each subimage of the extended picture is separated by a border 1032 (or gutter) of zero intensity of width $\tau$. This border is one of several possible preferred "boundary conditions" to achieve a doubly-periodic image.

Figure 8A:
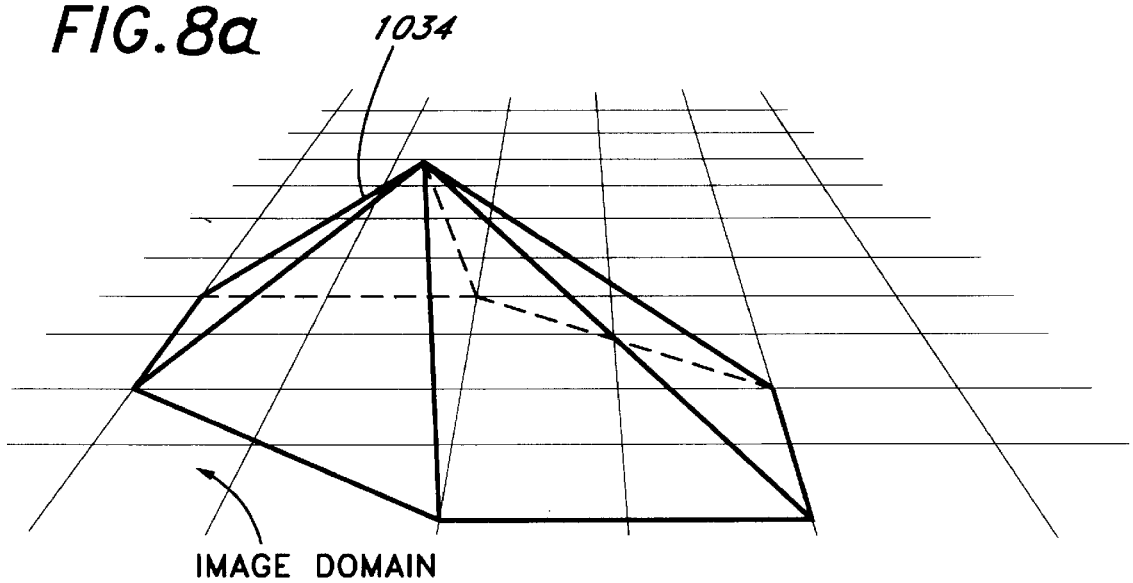
FIGS. 8a, 8b and 8c are perspective and plan views of a two-dimensional planar spline basis.

Consider now a doubly periodic planar spline, $F(t_1, t_2)$ which has the form of a six-sided pyramid or tent, centered at the origin and is repeated periodically with periods $n_1\tau$ and $n_2\tau$ with respect to integer variables $t_1$ and $t_2$, respectively. A perspective view of such a planar spline function 1034 is shown in FIG. 8a and may hereinafter be referred to as "hexagonal tent." Following the one-dimensional case by analogy, letting:

$$\Psi_{k_1k_2}(t_1,t_2) = F(t_1 - k_1\tau, t_2 - k_2\tau) \qquad (17)$$

for ($k_1 = 0,1, \ldots, n_1-1$) and ($k_2 = 0,1, \ldots, n_2-1$), the "best" weights $X_{k_1k_2}$ are found such that:

$$L(X_{k_1k_2}) = \sum_{t_1,t_2=-\tau}^{n_1\tau,n_2\tau} \left\langle \left( X(t_1, t_2) - \sum_{k_1,k_2=0}^{n_1-1,n_2-1} X_{k_1k_2} \Psi_{k_1k_2}(t_1, t_2) \right)^2 \right\rangle \qquad (18)$$

is a minimum.

A condition for L to be a minimum is $$\begin{aligned}
\frac{\partial L}{\partial X_{j_1j_2}} &= 2 \sum_{t_1,t_2=-\tau}^{n_1\tau,n_2\tau} \left\langle \left( X(t_1, t_2) - \sum_{k_1,k_2=0}^{n_1-1,n_2-1} X_{k_1k_2} \Psi_{k_1k_2}(t_1, t_2) \right) \Psi_{j_1j_2}(t_1, t_2) \right\rangle \\
&= 2 \left\langle \sum_{t_1,t_2=-\tau}^{n_1\tau,n_2\tau} X(t_1,t_2)\Psi_{j_1j_2}(t_1,t_2) - \sum_{k_1,k_2=0}^{n_1-1,n_2-1} X_{k_1k_2} \sum_{t_1,t_2=-\tau}^{n_1\tau,n_2\tau} \Psi_{j_1j_2}(t_1,t_2)\Psi_{k_1k_2}(t_1,t_2) \right\rangle \\
&\equiv 0.
\end{aligned} \qquad (19)$$

The best coefficients $X_{k_1k_2}$ are the solution of the 2nd-order tensor equation, $$A_{j_1j_2k_1k_2} X_{k_1k_2} = Y_{j_1j_2}, \qquad (20)$$

where the summation is on $k_1$ and $k_2$, $$A_{j_1j_2k_1k_2} = \sum_{t_1,t_2=-\tau}^{n_1\tau,n_2\tau} \Psi_{j_1j_2}(t_1, t_2)\Psi_{k_1k_2}(t_1, t_2) \qquad (21)$$

and $$Y_{j_1j_2} = \sum_{t_1,t_2=-\tau}^{n_1\tau,n_2\tau} X(t_1, t_2)\Psi_{j_1j_2}(t_1, t_2). \qquad (22)$$

With the visual aid of FIG. 8a, the tensor $Y_{j_1j_2}$ reduces as follows:

$$\begin{aligned}
Y_{j_1j_2} &= \sum_{t_1,t_2=-\tau}^{n_1\tau,n_2\tau} X(t_1,t_2)\Psi_{j_1j_2}(t_1,t_2) \\
&= \sum_{t_1,t_2=-\tau}^{n_1\tau,n_2\tau} X(t_1,t_2)F(t_1 - j_1\tau, t_2 - j_2\tau) \\
&= \sum_{t_1=(j_1-1)\tau}^{(j_1+1)\tau} \sum_{t_2=(j_2-1)\tau}^{(j_2+1)\tau} X(t_1,t_2)F(t_1 - j_1\tau, t_2 - j_2\tau).
\end{aligned} \qquad (23)$$

Letting $t_k - j_k\tau = m_k$ for $k=1,2$, then $$Y_{j_1j_2} = \sum_{m_1,m_2=-\tau+1}^{\tau-1} X(m_1 + j_1\tau, m_2 + j_2\tau)F(m_1, m_2) \qquad (24)$$

for ($j_1 = 0,1, \ldots, n_1-1$) and ($j_2 = 0,1, \ldots, n_2-1$)0,1, $\ldots, n_2-1$), where $F(m_1,m_2)$ is the doubly periodic, six-sided pyramidal function, shown in FIG. 8a. The tensor transform in Equation 21 is treated in a similar fashion to obtain $$\begin{aligned}
A_{j_1j_2k_1k_2} &= \sum_{t_1,t_2=-\tau}^{n_1\tau,n_2\tau} \Psi_{j_1j_2}(t_1,t_2)\Psi_{k_1k_2}(t_1,t_2) \\
&= \sum_{m_1,m_2=-\tau+1}^{\tau-1} F(m_1 + (j_1 - k_1)\tau, m_2 + (j_2 - k_2)\tau) F(m_1, m_2) \\
&= \begin{cases}
\sum_{m_1,m_2=-\tau+1}^{\tau-1} [F(m_1,m_2)]^2 & \triangleq \alpha \\
\quad \text{if } (j_1 - k_1) \equiv 0 \bmod n_1 \wedge (j_2 - k_2) \equiv 0 \bmod n_2 \\
\sum_{m_1,m_2=-\tau+1}^{\tau-1} F(m_1 \pm \tau, m_2)F(m_1,m_2) & \triangleq \beta \\
\quad \text{if } (j_1 - k_1) \equiv \pm 1 \bmod n_1 \wedge (j_2 - k_2) \equiv 0 \bmod n_2 \\
\sum_{m_1,m_2=-\tau+1}^{\tau-1} F(m_1, m_2 \pm \tau)F(m_1,m_2) & \triangleq \gamma \\
\quad \text{if } (j_1 - k_1) \equiv 0 \bmod n_1 \wedge (j_2 - k_2) \equiv \pm 1 \bmod n_2 \\
\sum_{m_1,m_2=-\tau+1}^{\tau-1} F(m_1 \pm \tau, m_2 \pm \tau)F(m_1,m_2) & \triangleq \xi \\
\quad \text{if } (j_1 - k_1) \equiv \pm 1 \bmod n_1 \wedge (j_2 - k_2) \equiv \pm 1 \bmod n_2 \\
\sum_{m_1,m_2=-\tau+1}^{\tau-1} F(m_1 \mp \tau, m_2 \pm \tau)F(m_1,m_2) & \triangleq \eta \\
\quad \text{if } (j_1 - k_1) \equiv \mp 1 \bmod n_1 \wedge (j_2 - k_2) \equiv \pm 1 \bmod n_2.
\end{cases}
\end{aligned} \qquad (25)$$

Figure 8B:
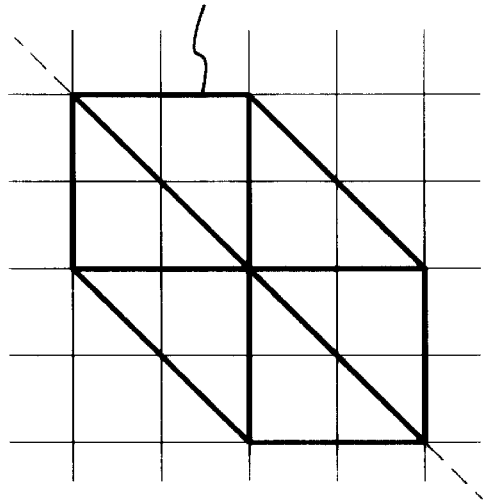
Figure 8C:
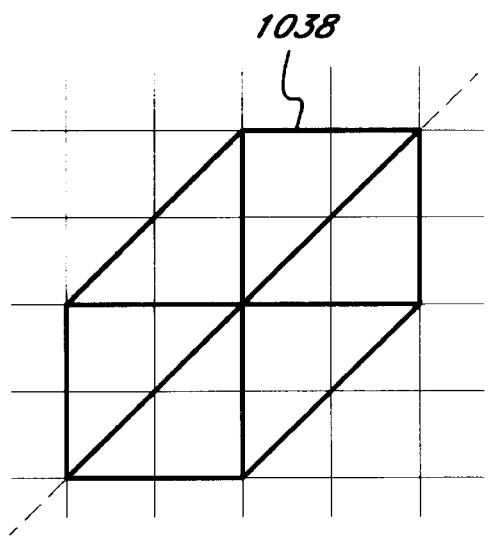

The values of $\alpha$, $\beta$, $\gamma$, and $\xi$ depend on $\tau$, and the shape and orientation of the hexagonal tent with respect to the image domain, where for example $m_1$ and $m_2$ represent row and column indices. For greater flexibility in tailoring the hexagonal tent function, it is possible to utilize all parameters of the $[A_{j_1j_2k_1k_2}]$. However, to minimize calculational overhead it is preferable to employ symmetric hexagons, disposed over the image domain with a bi-directional period $\tau$. Under these conditions, $\beta = \gamma = \xi$ and $\eta = 0$, simplifying $[A_{j_1j_2k_1k_1}]$ considerably. Specifically, the hexagonal tent depicted in FIG. 8a and having an orientation depicted in FIG. 8b is described by the preferred case in which $\beta=\gamma=\xi$ and $\eta=0$. It will be appreciated that other orientations and shapes of the hexagonal tent are possible, as depicted, for example, in FIG. 8c. Combinations of hexagonal tents are also possible and embody specific preferable attributes. For example, a superposition of the hexagonal tents shown in FIGS. 8b and 8c effectively "symmetrizes" the compression process.

From Equation 25 above, $A_{j_1 j_2 k_1 k_2}$ can be expressed in circulant form by the following expression:

$$A_{j_1 j_2 k_1 k_2} = a_{(k_1-j_1)n_1,(k_2-j_2)n_2}. \tag{26}$$

where $(k_l-j_l)_{nl}$ denote $(k_1-j_1)$ mod $n_l$, $l=1,2$, and $$[a_{s_1 s_2}] = \begin{bmatrix} a_{00} & a_{00} & a_{00} & \cdots & a_{a,n_2-1} \\ a_{00} & a_{00} & a_{00} & \cdots & a_{1,n_2-1} \\ a_{00} & a_{00} & a_{00} & \cdots & a_{2,n_2-1} \\ \cdot & \cdot & \cdot & & \cdot \\ \cdot & \cdot & \cdot & & \cdot \\ \cdot & \cdot & \cdot & & \cdot \\ a_{n_1-1,0} & a_{n_1-1,1} & a_{n_1-1,2} & \cdots & a_{n_1-1,n_2-1} \end{bmatrix} \tag{27}$$

$$= \begin{bmatrix} \alpha & \beta & 0 & \cdots & 0 & \beta \\ \beta & \beta & 0 & \cdots & 0 & 0 \\ 0 & 0 & 0 & \cdots & 0 & 0 \\ \cdot & \cdot & \cdot & & \cdot & \cdot \\ \cdot & \cdot & \cdot & & \cdot & \cdot \\ \cdot & \cdot & \cdot & & \cdot & \cdot \\ 0 & 0 & 0 & \cdots & 0 & 0 \\ \beta & 0 & 0 & \cdots & 0 & \beta \end{bmatrix},$$

where $(s_1=0,1,2,\ldots n_1-1)$ and $(s_2=1,2,3,\ldots,n_2-1)$. Note that when $[a_{s_1,s_2}]$ is represented in matrix form, it is "block circulant."

C. Compression-Reconstruction Algorithms

Because the objective is to apply the above-disclosed LMS error linear spline interpolation techniques to image sequence coding, it is advantageous to utilize the tensor formalism during the course of the analysis in order to readily solve the linear systems in equations 8 and 20. Here, the tensor summation convention is used in the analysis for one and two dimensions. It will be appreciated that such convention may readily apply to the general case of N dimensions.

1. Linear Transformation of Tensors

A linear transformation of a 1st-order tensor is written as $$Y_r = A_{rs} X_s \text{ (sum on s)}, \tag{28}$$

where $A_{rs}$ is a linear transformation, and $Y_r, X_s$ are 1st-order tensors. Similarly, a linear transformation of a second order tensor is written as:

$$Y_{r_1 r_2} = A_{r_1 r_2 s_1 s_2} X_{s_1 s_2} \text{ (sum on } S_1,S_2). \tag{29}$$

The product or composition of linear transformations is defined as follows. When the above Equation 29 holds, and $$Z_{q_1 q_2} = B_{q_1 q_2 r_1 r_2} Y_{r_1 r_2}, \tag{30}$$

then $$Z_{q_1 q_2} = B_{q_1 q_2 r_1 r_2} A_{r_1 r_2 s_1 s_2} X_{s_1 s_2}. \tag{31}$$

Hence, $$C_{q_1 q_2 s_1 s_2} = B_{q_1 q_2 r_1 r_2} A_{r_1 r_2 s_1 s_2} \tag{32}$$

is the composition or product of two linear transformations.

2. Circulant Transformation of 1st-Order Tensors

The tensor method for solving equations 8 and 20 is illustrated for the 1-dimensional case below:

Letting $A_{rs}$ represent a circulant tensor of the form:

$$A_{rs} = a_{(s-r) \bmod n} \text{ for } (r,s=0,1,2,\ldots,n-1), \tag{33}$$

and considering the n special 1st-order tensors as $$W_s^{(l)} = (\omega^l)^s \text{ for } (l=0,1,2,\ldots,n-1), \tag{34}$$

where $\omega$ is the n-th root of unity, then $$A_{rs} W_s^{(l)} = \lambda(l) W_r^{(l)}, \tag{35}$$

where $$\lambda(l) = \sum_{j=0}^{n-1} a_j (\omega^l)^j \tag{36}$$

are the distinct eigenvalues of $A_{rs}$. The terms $W_s^{(l)}$ are orthogonal.

$$W_s^{(l)} W_s^{(j)*} = \begin{cases} 0 \text{ for } l \neq j \\ n \text{ for } l = j. \end{cases} \tag{37}$$

At this point it is convenient to normalize these tensors as follows:

$$\phi_s^{(l)} \triangleq \frac{1}{\sqrt{n}} W_s^{(l)} \text{ for } (l=0,1,2,\ldots,n-1). \tag{38}$$

$\phi_s^{(l)}$ evidently also satisfies the orthonormal property, i.e., $$\phi_s^{(l)} \phi_s^{(j)*} = \delta_{lj} \tag{39}$$

where $\delta_{lj}$ is the Kronecker delta function and * represents complex conjugation.

A linear transformation is formed by summing the n dyads $\phi_r^{(l)} \phi_s^{(l)*}$ for $l=0,1,\ldots,n-1$ under the summation sign as follows:

$$\tilde{A}_{rs} = \sum_{l=0}^{n-1} \lambda(l) \phi_r^{(l)} \phi_s^{(l)*}. \tag{40}$$

$$\tilde{A}_{rs} \phi_s^{(j)} = \sum_{\substack{j=0 \\ l=0 \\ n-1}}^{n-1} \lambda(l) \phi_r(l) \phi_s(l)^* \phi_s(j) \tag{41}$$

$$= \sum \lambda(l) \phi_r(l) \delta_{lj}$$

$$= \lambda(j) \phi_r(j).$$

Since $\tilde{A}_{rs}$ has by a simple verification the same eigenvectors and eigenvalues as the transformation $A_{rs}$ has in Equations 9 and 33, the transformation $\tilde{A}_{rs}$ and $A_{rs}$ are equal.

3. Inverse Transformation of 1st-Order Tensors.

The inverse transformation of $A_{rs}$ is shown next to be $$A_{rs}^{-1} = \sum_{l=0}^{n-1} \frac{1}{\lambda(l)} \phi_r^l \phi_s^{l*}. \tag{42}$$

This is proven easily, as shown below:

$$A_{rs} A_{st}^{-1} = \sum_{l=0}^{n-1} \sum_{l'=0}^{n-1} \lambda(l) \frac{1}{\lambda(l')} \phi_r^l \phi_s^{l*} \phi_s^{l'} \phi_t^{l'*} \tag{43}$$

$$= \sum_{l=0}^{n-1} \sum_{l'=0}^{n-1} \lambda(l) \frac{1}{\lambda(l')} \phi_r^l \delta_{ll'} \phi_t^{l'*} = \sum_{l=0}^{n-1} \phi_r^l \phi_t^{l*}$$

$$= \sum_{l=0}^{n-1} \frac{1}{n} (\omega^l)^{rt} = \sum_{l=0}^{n-1} \frac{1}{n} (\omega^{rt})^l = \delta_{rt}$$

4. Solving 1st-Order Tensor Equations

The solution of a 1st-order tensor equation $Y_r = A_{rs}X$ is given by $$A_{qr}^{-1}Y_r = A_{qr}^{-1}A_{rs}X_s = \delta_{qs}X_s = X_q, \quad (44)$$

so that $$\begin{aligned}
X_r &= A_{rs}^{-1}Y_s \quad (45)\\
&= \sum_{l=0}^{n-1} \frac{1}{\lambda(l)}\phi_r^l \phi_s^{l*} Y_s\\
&= \sum_{l=0}^{n-1}\left(\frac{\phi_s^{l*}Y_s}{\lambda(l)}\right)\phi_r^l = \sum_{l=0}^{n-1}\left[\frac{1}{\lambda(l)}\left(\frac{1}{n}\sum_{k=0}^{n-1}Y_k \omega^{-lk}\right)\right]\omega^{lr}\\
&= DFT\left[\frac{1}{\lambda(l)} DFT^{-1}(Y_k)\right].
\end{aligned}$$

where DFT denotes the discrete Fourier Transform and $DFT^{-1}$ denotes its inverse discrete Fourier Transform.

An alternative view of the above solution method is derived below for one dimension using standard matrix methods. A linear transformation of a 1st-order tensor can be represented by a matrix. For example, let A denote $A_{rs}$ in matrix form. If $A_{rs}$ is a circulant transformation, then A is also a circulant matrix. From matrix theory it is known that every circulant matrix is "similar" to a DFT matrix. If Q denotes the DFT matrix of dimension (n×n), and $Q^t$ the complex conjugate of the DFT matrix, and $\Lambda$ is defined to be the eigenmatrix of A, then:

$$A = Q\Lambda Q^t. \quad (46)$$

The solution to y=Ax is then $$X = A^{-1}Y = Q\Lambda^{-1}(Q^tY).$$

For the one-dimensional process described above, the eigenvalues of the transformation operators are:

$$\begin{aligned}
\lambda(l) &= \sum_{j=0}^{n-1} a_j(w^l)^j \quad (47)\\
&= DFT(a_j).
\end{aligned}$$

where $a_0 = \alpha$, $a_1 = \beta$, ..., $a_{n-2} = 0$, $a_{n-1} = \beta$, and $\omega^n = 1$. Hence:

$$\begin{aligned}
\lambda(l) &= \alpha + \beta\omega^l + \beta\omega^{(n-1)l} \quad (48)\\
&= \alpha + \beta(\omega^l + \omega^{-l}).
\end{aligned}$$

Figure 9A:
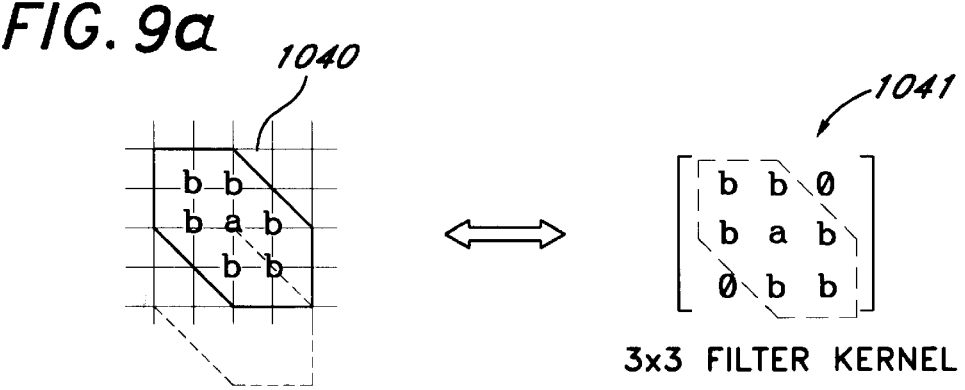
FIG. 9 is a diagram showing representations of the hexagonal tent function.
Figure 9B:
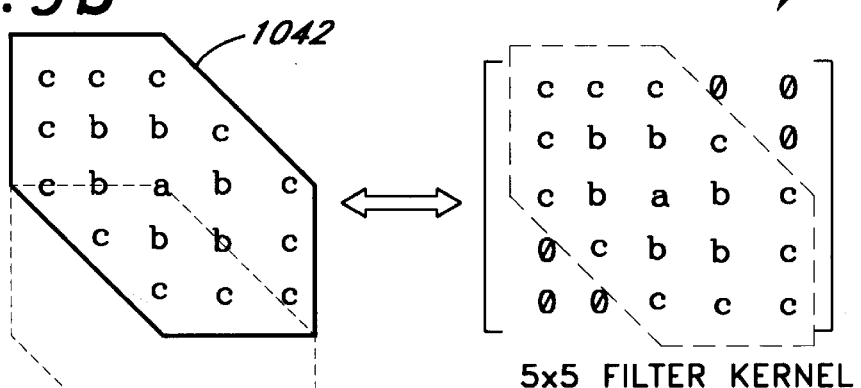
Figure 9C:
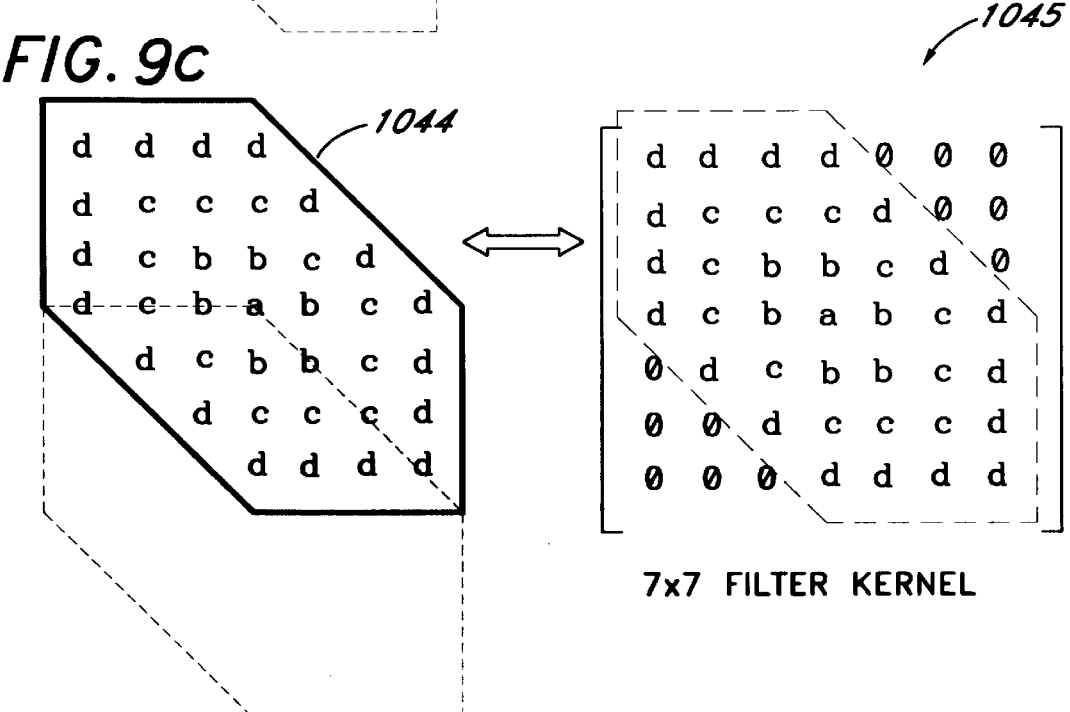

A direct extension of the 1st-order tensor concept to the 2nd-order tensor will be apparent to those skilled in the art. By solving the 2nd-order tensor equations, the results are extended to compress a 2-D image. FIG. 9 depicts three possible hexagonal tent functions for 2-dimensioned image compression indices $\tau = 2,3,4$. The following table exemplifies the relevant parameters for implementing the hexagonal tent functions:

| Decimation Index ($\tau$) | $\tau = 2$ | $\tau = 3$ | $\tau = 4$ |
|---|---|---|---|
| Compression Ratio ($\tau^2$) | 4 | 9 | 16 |
| $\alpha$ | $a^2 + 6b^2$ | $a^2 + 6b^2 + 12c^2$ | $a^2 + 6b^2 + 12c^2 + 18d^2$ |
| $\beta$ | $b^2$ | $2(c^2 + bc)$ | $2d^2 + 2db + 4dc + c^2$ |
| gain | $a + 6b$ | $a + 6b + 12c$ | $a + 6b + 12c + 18d$ |

The algorithms for compressing and reconstructing a still image are explained in the succeeding sections.

III. OVERVIEW OF CODING-RECONSTRUCTION SCHEME

Figure 10:
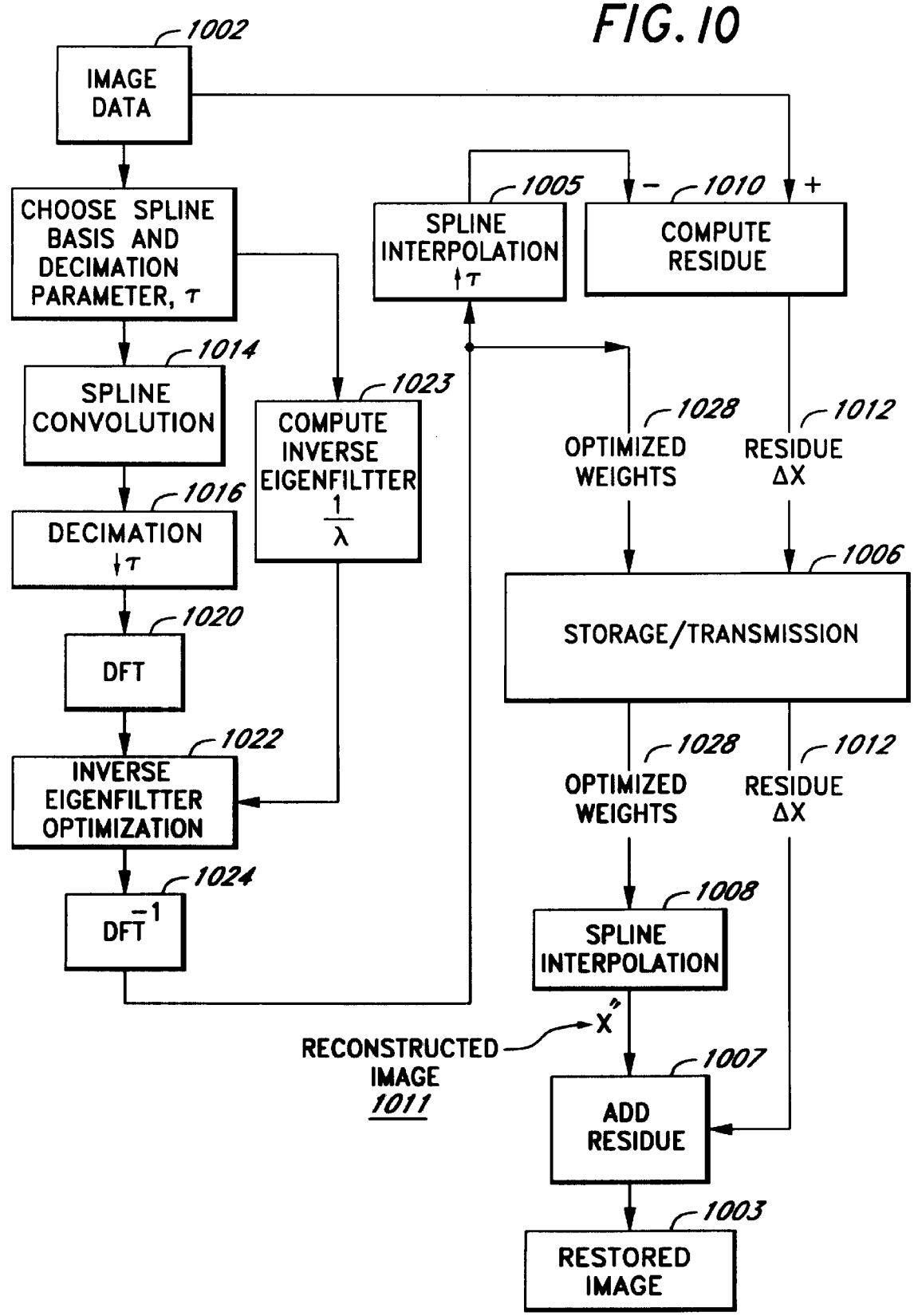
FIG. 10 is a flow diagram of compression and reconstruction of image data.
Figure 11:
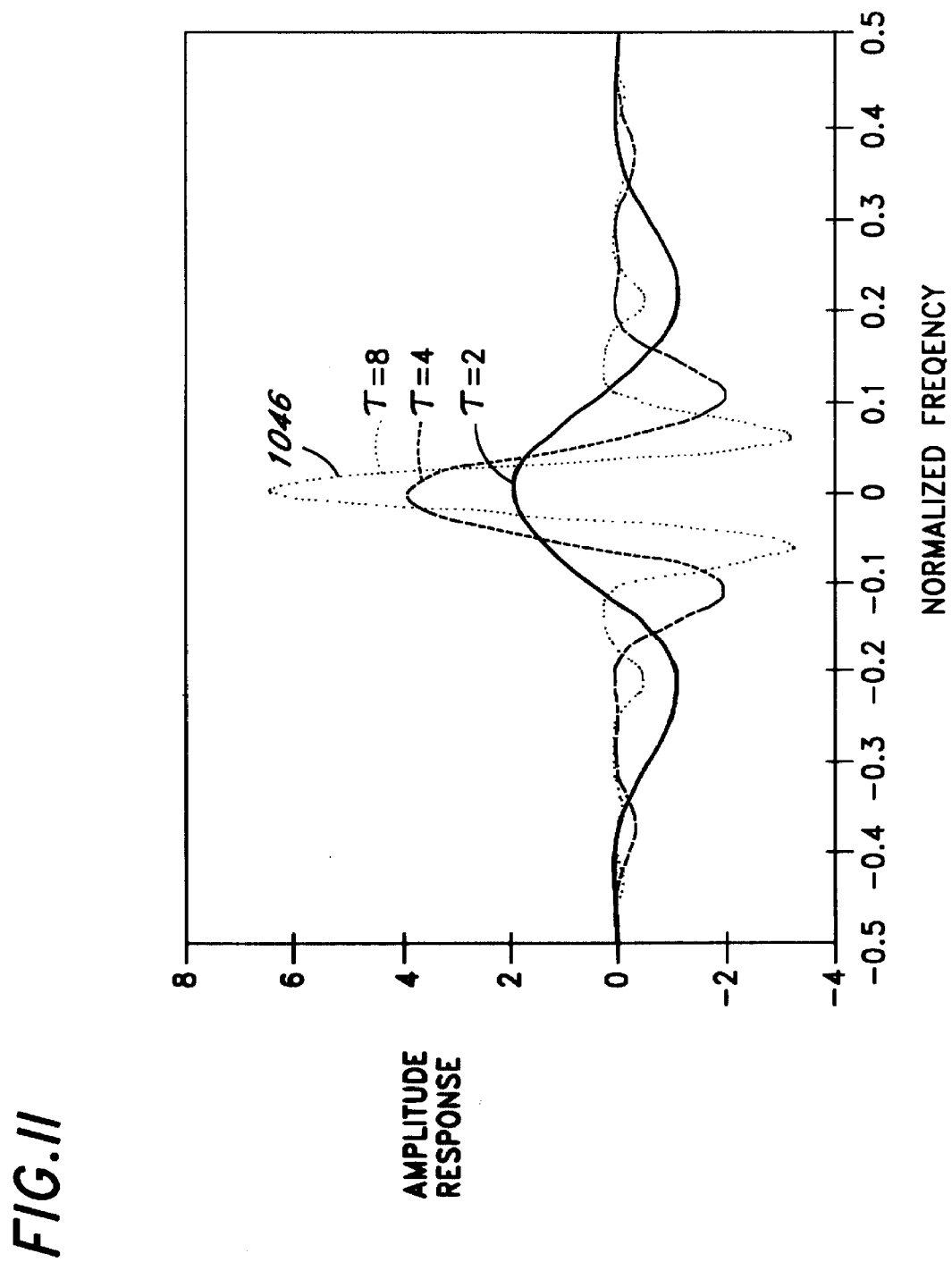
FIG. 11 is a graphical representation of a normalized frequency response of a one-dimensional bi-linear spline basis.
Figure 12A:
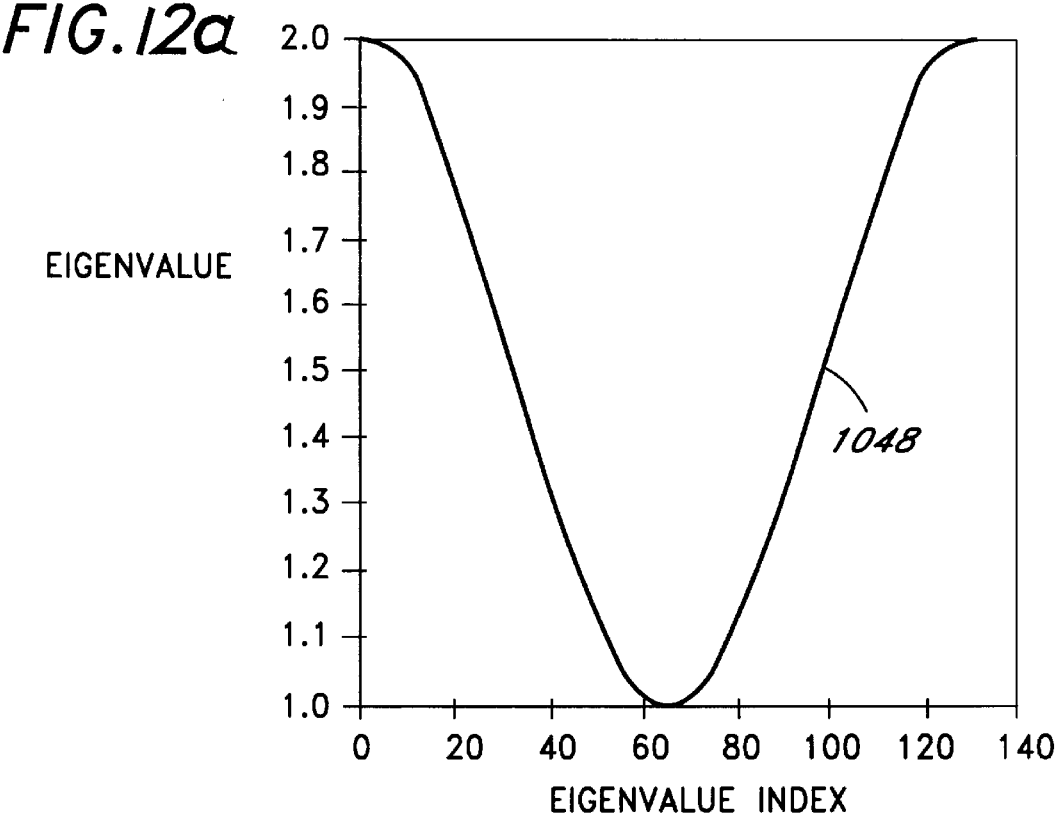
FIG. 12 is a graphical representation of a one-dimensional eigenfilter frequency response.
Figure 12B:
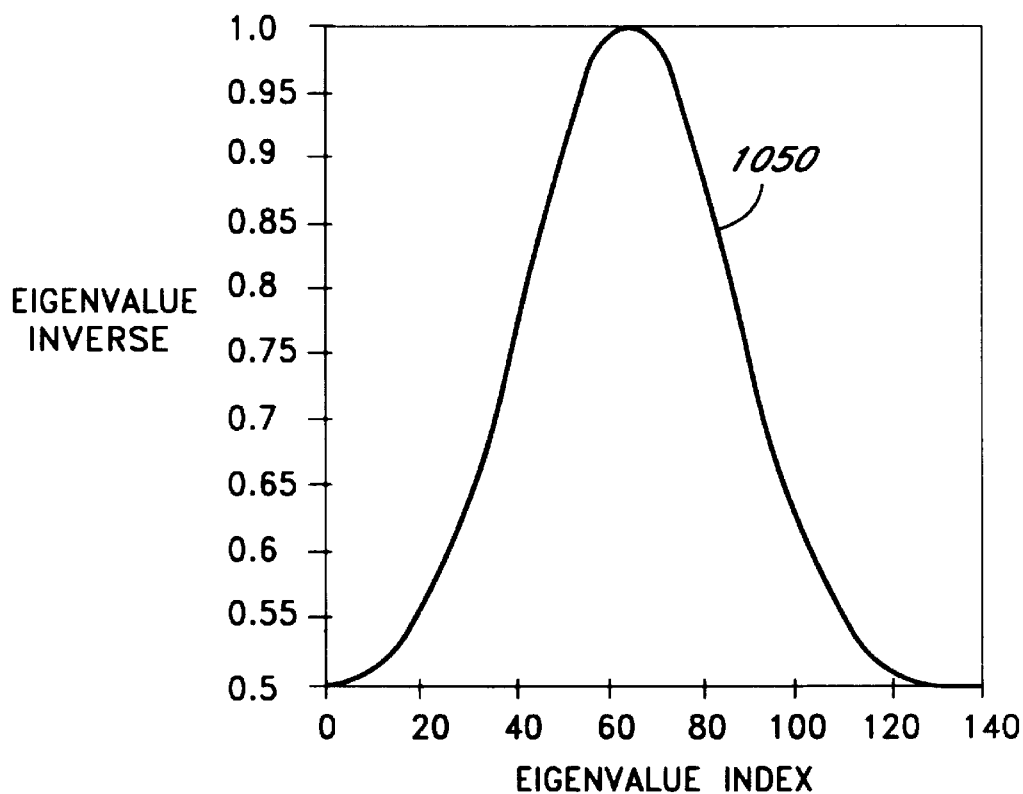
Figure 13B:
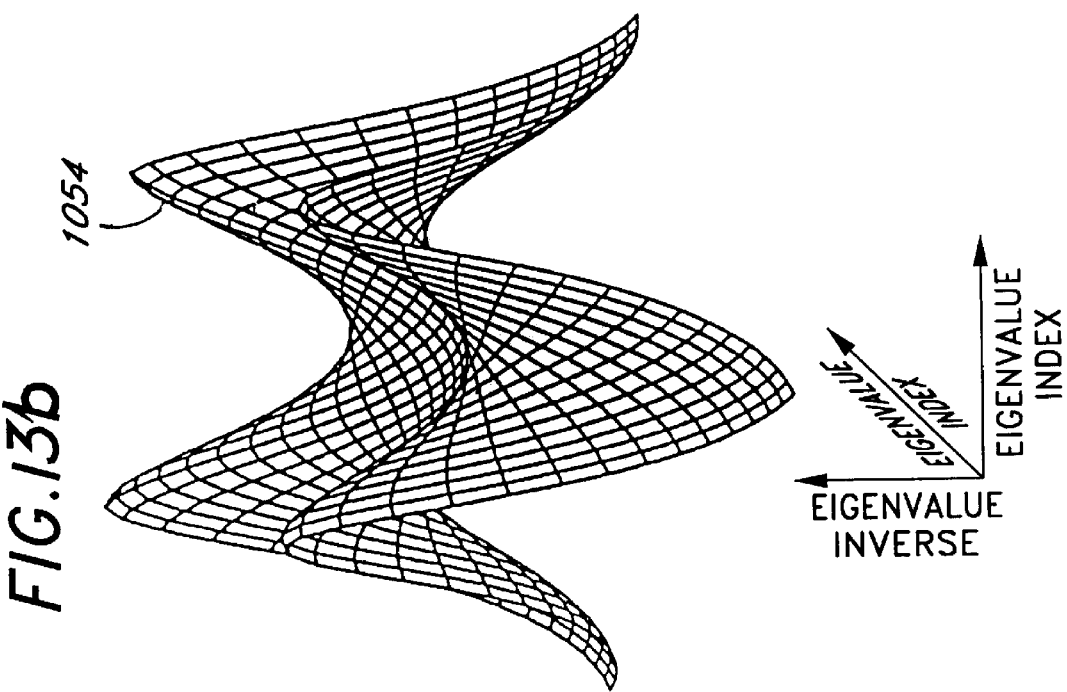
FIGS. 13a–13b are a perspective view of a two-dimensional eigenfilter frequency response.
Figure 13A:
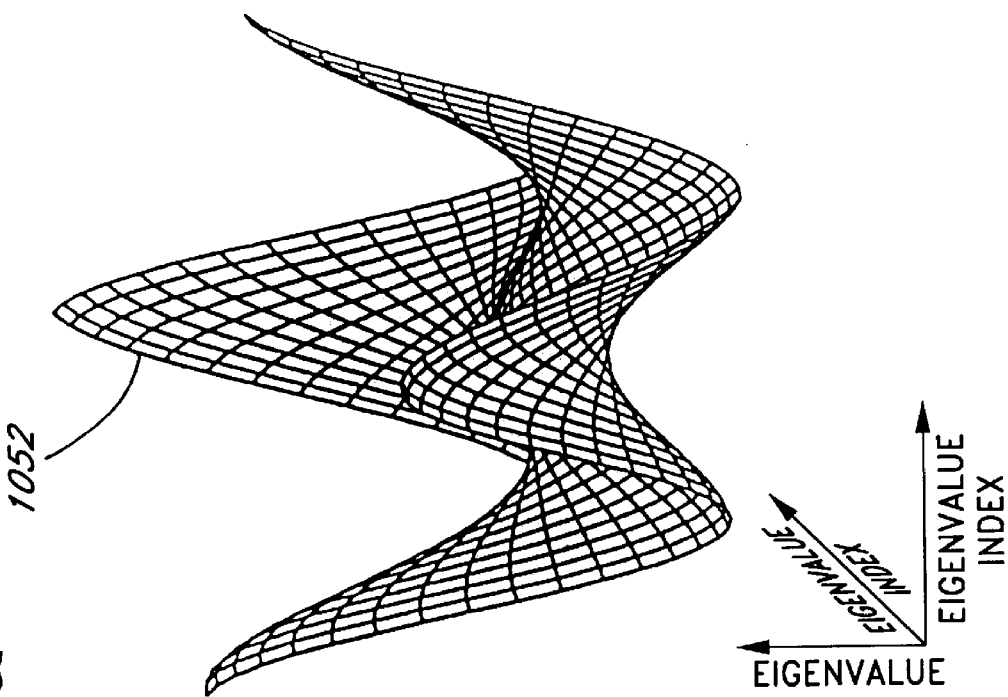

A block diagram of the compression/reconstruction scheme is shown in FIG. 10. The signal source 1002, which can have dimension up to N, is first passed through a low-pass filter (LPF). This low-pass filter is implemented by convolving (in a process block 1014) a chosen spline filter 1013 with the input source 1002. For example, the normalized frequency response 1046 of a one-dimensional linear spline is shown in FIG. 11. Referring again to FIG. 10, it can be seen that immediately following the LPF, a subsampling procedure is used to reduce the signal size 1016 by a factor $\tau$. The information contained in the subsampled source is not optimized in the least-mean-square sense. Thus, an optimization procedure is needed to obtain the best reconstruction weights. The optimization process can be divided into three consecutive parts. A DFT 1020 maps the non-optimized weights into the image conjugate domain. Thereafter, an inverse eigenfilter process 1022 optimizes the compressed data. The frequency response plots for some typical eigenfilters and inverse eigenfilters are shown in FIGS. 12 and 13. After the inverse eigenfilter 1022, a $DFT^{-1}$ process block 1024 maps its input back to the original image domain. When the optimized weights are derived, reconstruction can proceed. The reconstruction can be viewed as oversampling followed by a reconstruction low-pass filter.

The embodiment of the optimized spline filter described above may employ a DFT and $DFT^{-1}$ type transform processes. However, those skilled in the art of digital image processing will appreciate that it is preferable to employ a Fast Fourier Transform (FFT) and $FFT^{-1}$ processes, which substantially reduce computation overhead associated with conjugate transform operations. Typically, such an improvement is given by the ratio of computation steps required to transform a set of N elements:

$$\frac{FFT}{DFT} = \frac{\frac{N}{2}\log_2(N)}{N^2} = \frac{1}{2N}\log_2(N),$$

which improves with the size of the image.

A. The Compression Method

The coding method is specified in the following steps:

1. A suitable value of $\tau$ (an integer) is chosen. The compression ratio is $\tau^2$ for two-dimensional images.
2. Equation 23 is applied to find $Y_{j_1,j_2}$ which is the compressed data to be transmitted or stored:

$$\begin{aligned}
Y_{j_1 j_2} &= \sum_{t_1,t_2=-\tau}^{n_1\tau, n_2\tau} X(t_1,t_2)\Psi_{j_1 j_2}(t_1,t_2)\\
&= \sum_{t_1,t_2=-\tau}^{n_1,n_2} X(t_1,t_2)F(t_1 - j_1\tau, t_2 - j_2\tau)\\
&= \sum_{t_1=(j_1-1)\tau}^{(j_1+1)\tau}\sum_{t_2=(j_2-1)\tau}^{(j_2+1)\tau} X(t_1,t_2)F(t_1 - j_1\tau, t_2 - j_2\tau)
\end{aligned}$$

B. The Reconstruction Method

The reconstruction method is shown below in the following steps:

1. Find the $FFT^{-1}$ of $Y_{j_1,j_2}$ (the compressed data).
2. The results of step 1 are divided by the eigenvalues $\lambda(l,m)$ set forth below. The eigenvalues $\lambda(l,m)$ are found by extending Equation 48 to the two-dimensional case to obtain:

$$\lambda(l,m) = \alpha + \beta(\omega_1^l + \omega_1^{-l} + \omega_2^m + \omega_2^{-m} + \omega_1^l\omega_2^{-m} + \omega_1^{-l}\omega_2^m), \quad (49)$$

where $\omega_1$ is the $n_1$-th root of unity and $\omega_2$ is the $n_2$-th root of unity.

3. The FFT of the results from step 2 is then taken. After computing the FFT, $X_{k_1,k_2}$ (the optimized weights) are obtained.

4. The recovered or reconstructed image is:

$$S(t_1,t_2) = \sum_{k_1,k_2=0}^{n_1-1,n_2-1} X_{k_1 k_2} \Psi_{k_1 k_2}(t_1,t_2). \quad (50)$$

5. Preferably, the residue is computed and retained with the optimized weights:

$$\Delta X(t_1,t_2) = X(t_1,t_2) - S(t_1,t_2).$$

Although the optimizing procedure outlined above appears to be associated with an image reconstruction process, it may be implemented at any stage between the aforementioned compression and reconstruction. It is preferable to implement the optimizing process immediately after the initial compression so as to minimize the residual image. The preferred order has an advantage with regard to storage, transmission and the incorporation of subsequent image processes.

C. Response Considerations

The inverse eigenfilter in the conjugate domain is described as follows:

$$H(i,j) = \frac{1}{\lambda(i,j)}. \quad (51)$$

where $\lambda(i,j)$ can be considered as an estimation of the frequency response of the combined decimation and interpolation filters. The optimization process $H(i,j)$ attempts to "undo" what is done in the combined decimation/interpolation process. Thus, $H(i,j)$ tends to restore the original signal bandwidth. For example, for $\tau=2$, the decimation/interpolation combination is described as having an impulse response resembling that of the following 3×3 kernel:

$$R = \begin{pmatrix} 0 & \beta & \beta \\ \beta & \alpha & \beta \\ \beta & \beta & 0 \end{pmatrix}. \quad (52)$$

Then, its conjugate domain counterpart, $\lambda(i,j)|_{\alpha,\beta,N}$, will be $$\lambda(i,j)|_{\alpha,\beta,N} = \alpha + 2\beta \left[ \cos\left(\frac{2\pi i}{N}\right) + \cos\left(\frac{2\pi j}{N}\right) + \cos\left[2\pi\left(\frac{i}{N} - \frac{j}{N}\right)\right] \right], \quad (53)$$

where i,j are frequency indexes and N represents the number of frequency terms. Hence, the implementation accomplished in the image conjugate domain is the conjugate equivalent of the inverse of the above 3×3 kernel. This relationship will be utilized more explicitly for the embodiment disclosed in Section V.

IV. NUMERICAL SIMULATIONS

A. One-Dimensional Case

For a one-dimensional implementation, two types of signals are demonstrated. A first test is a cosine signal which is useful for observing the relationship between the standard error, the size of $\tau$ and the signal frequency. The standard error is defined herein to be the square root of the average error:

$$\left[ \frac{1}{N} \sum_t (\Delta X(t))^2 \right]^{1/2}.$$

A second one-dimensional signal is taken from one line of a grey-scale still image, which is considered to be realistic data for practical image compression.

Figure 14:
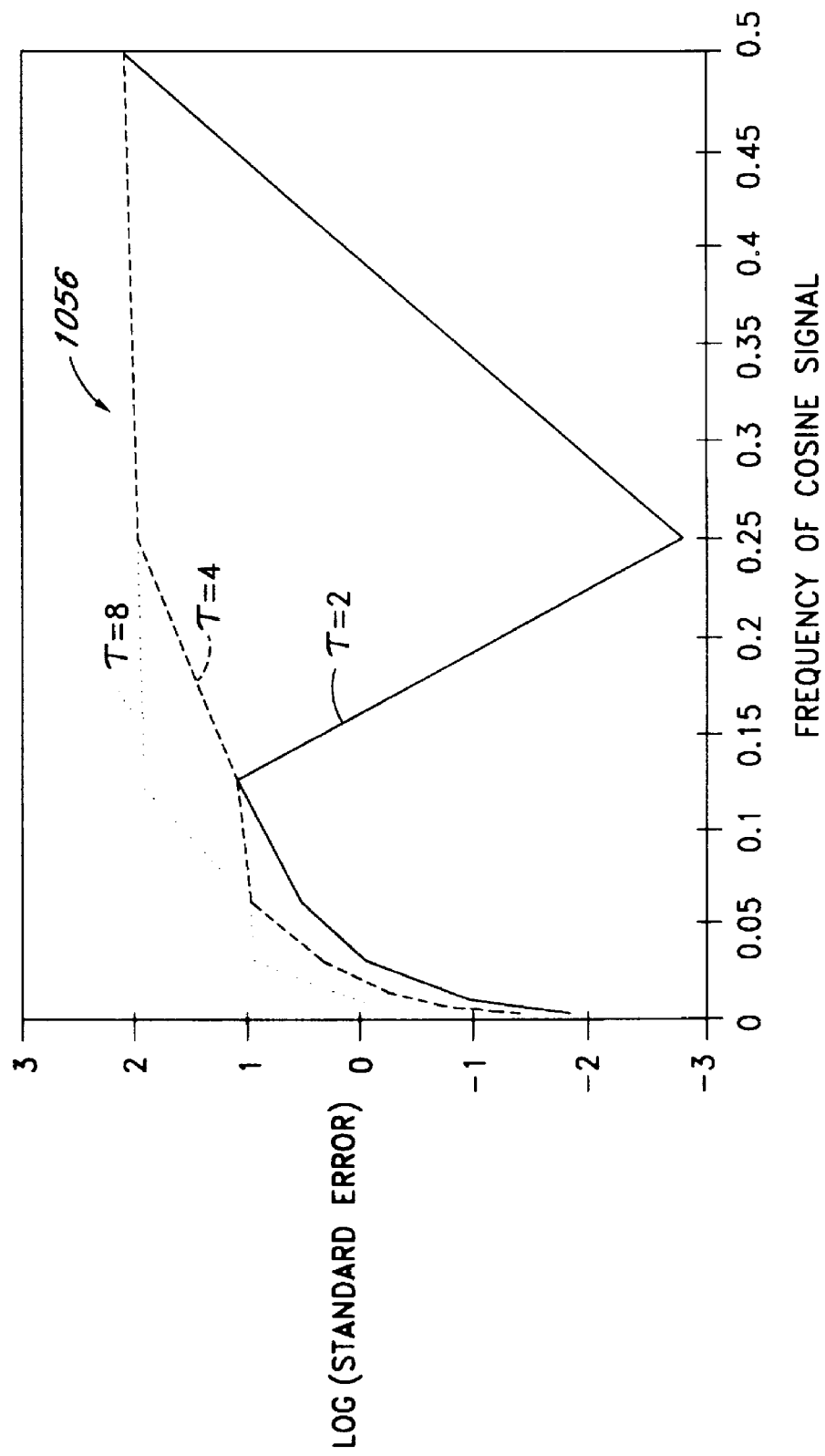
FIG. 14 is a plot of standard error as a function of frequency for a one-dimensional cosinusoidal image.

FIG. 14 shows the plots of standard error versus frequency of the cosine signal for different degrees of decimation $\tau$ 1056. The general trend is that as the input signal frequency becomes higher, the standard error increases. In the low frequency range, smaller values of $\tau$ yield a better performance. One abnormal phenomenon exists for the $\tau=2$ case and a normalized input frequency of 0.25. For this particular situation, the linear spline and the cosine signal at discrete grid points can match perfectly so that the standard error is substantially equal to 0.

Figure 15A:
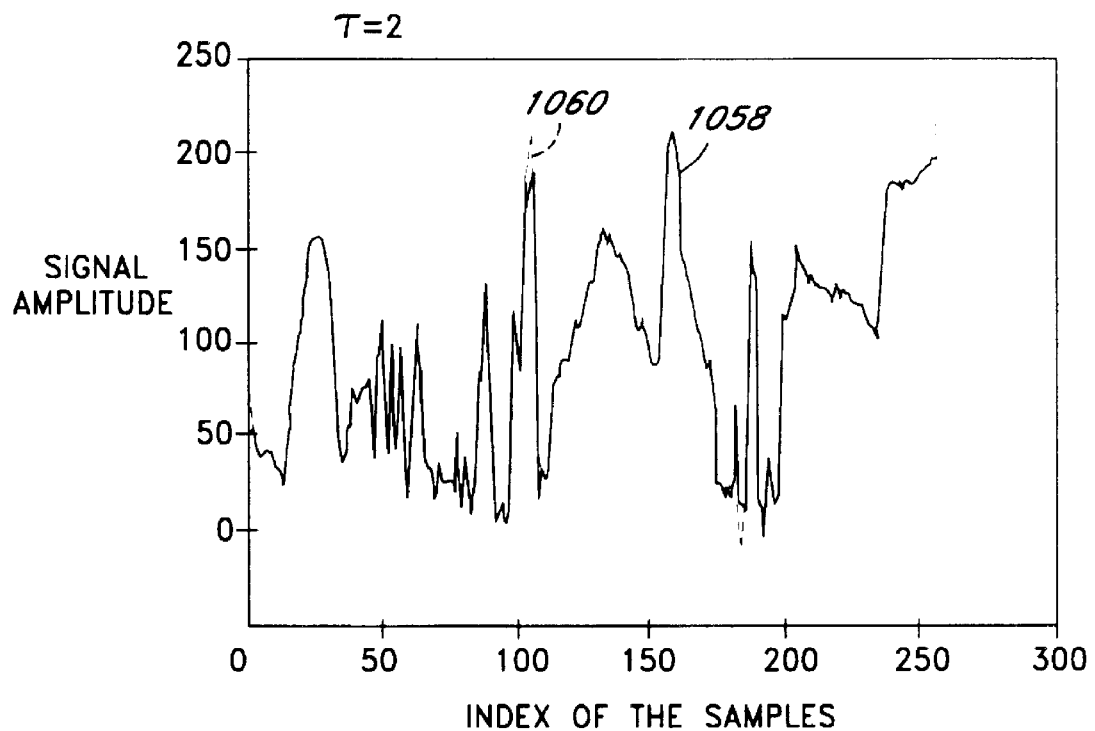
FIGS. 15a–15c are a plot of original and reconstructed one-dimensional images and a plot of standard error.
Figure 15B:
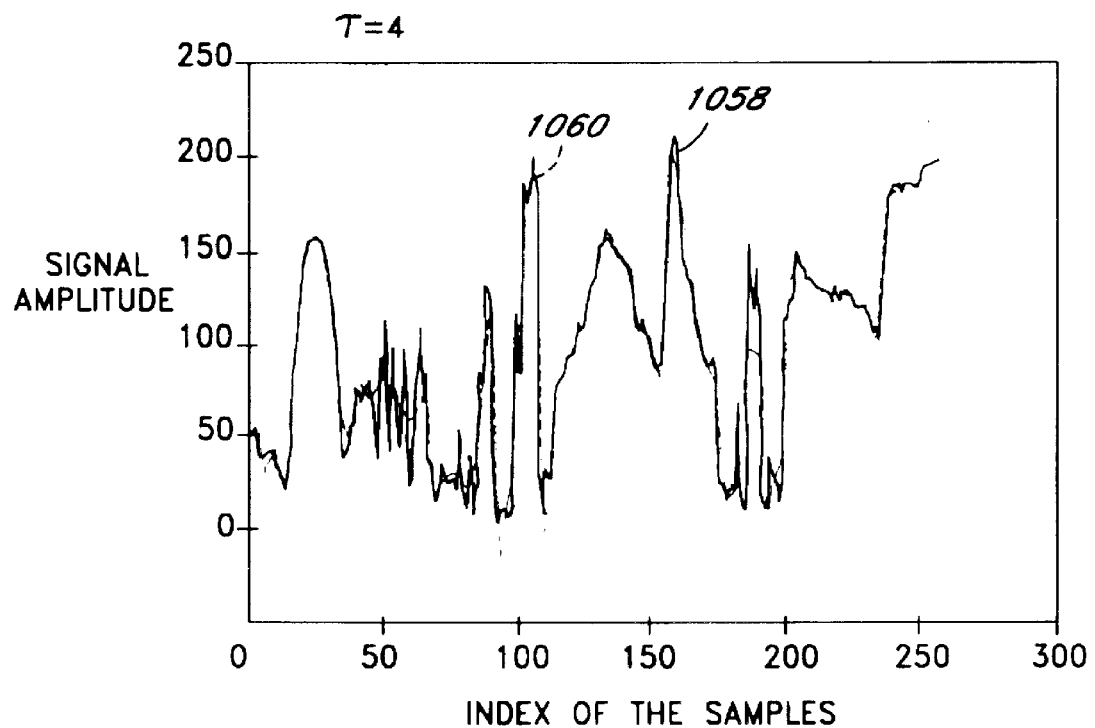
Figure 15C:
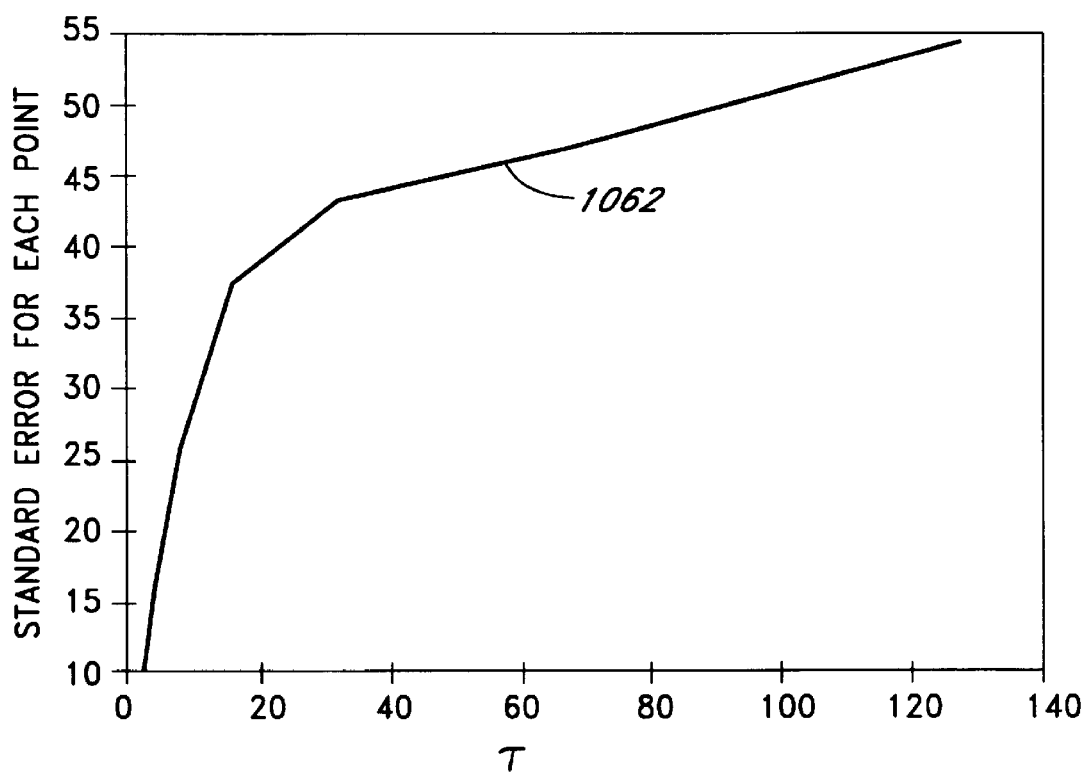

Another test example comes from one line of realistic still image data. FIGS. 15a and 15b show the reconstructed signal waveform 1060 for $\tau=2$ and $\tau=4$, respectively, superimposed on the original image data 1058. FIG. 15a shows a good quality of reconstruction for $\tau=2$. For $\tau=4$, in FIG. 15b, some of the high frequency components are lost due to the combined decimation/interpolation procedure. FIG. 15c presents the error plot 1062 for this particular test example. It will be appreciated that the non-linear error accumulation versus decimation parameter $\tau$ may be exploited to minimize the combination of optimized weights and image residue.

B. Two-Dimensional Case

Figure 16A:
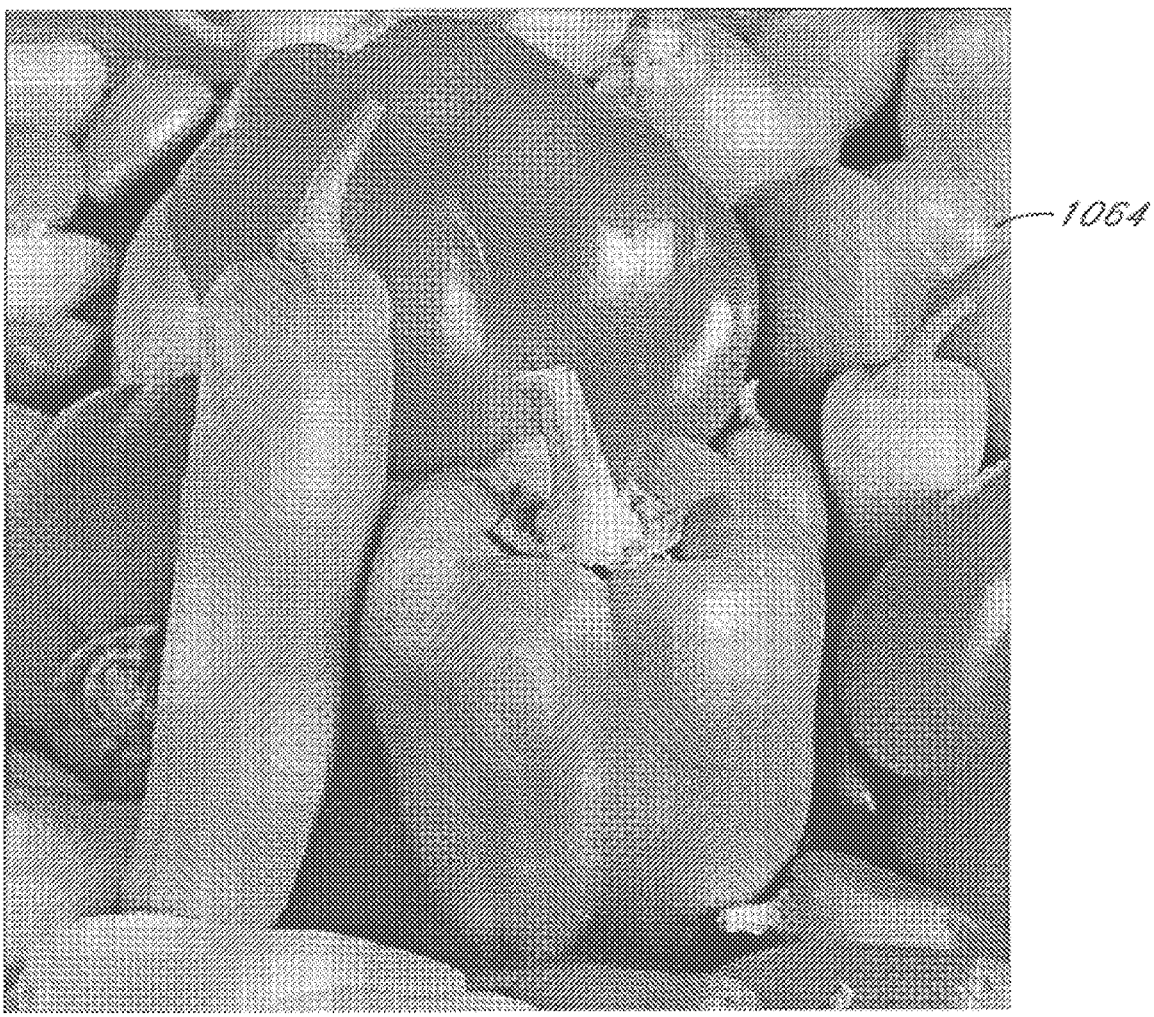
FIGS. 16a–16c are a first two-dimensional image reconstruction for different compression factors.
Figure 16B:
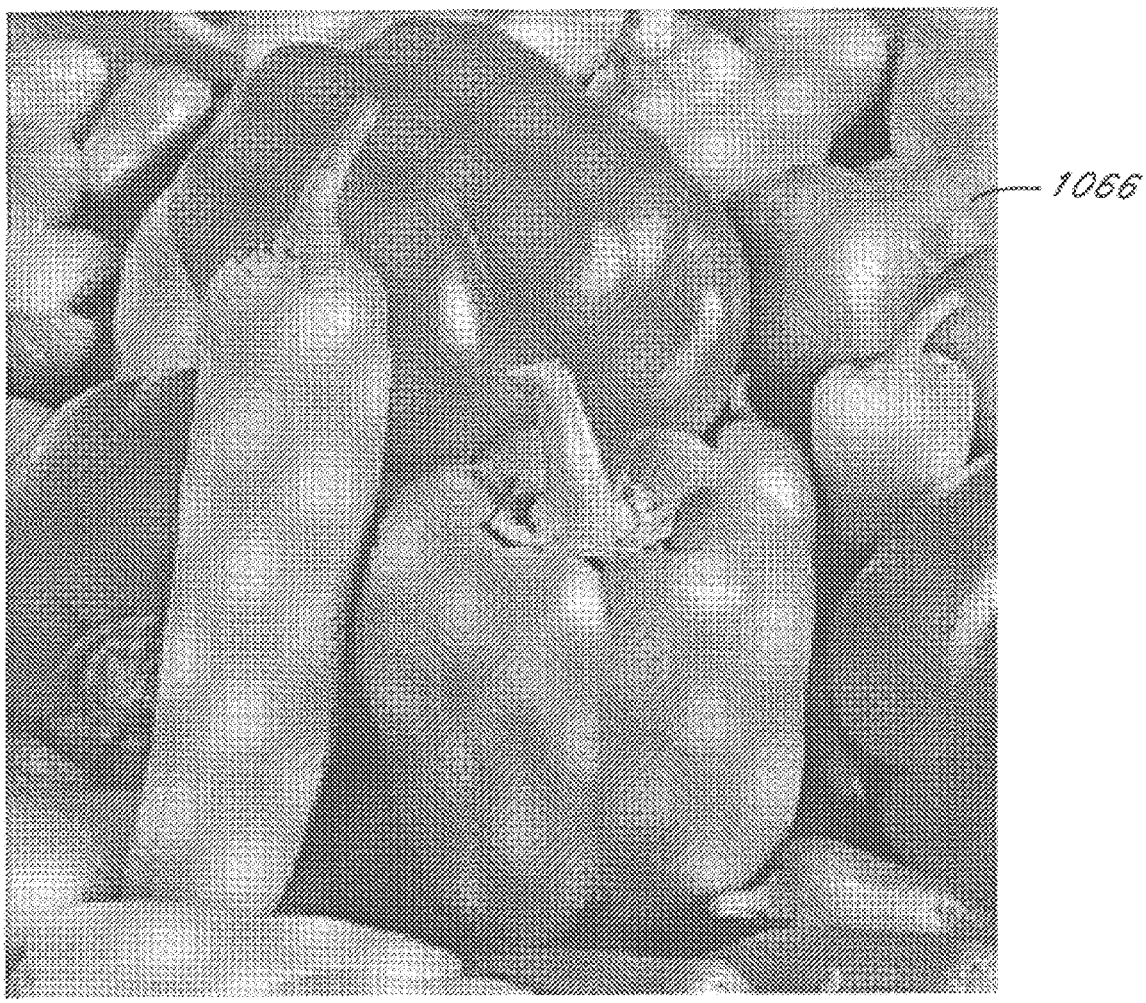
Figure 16C:
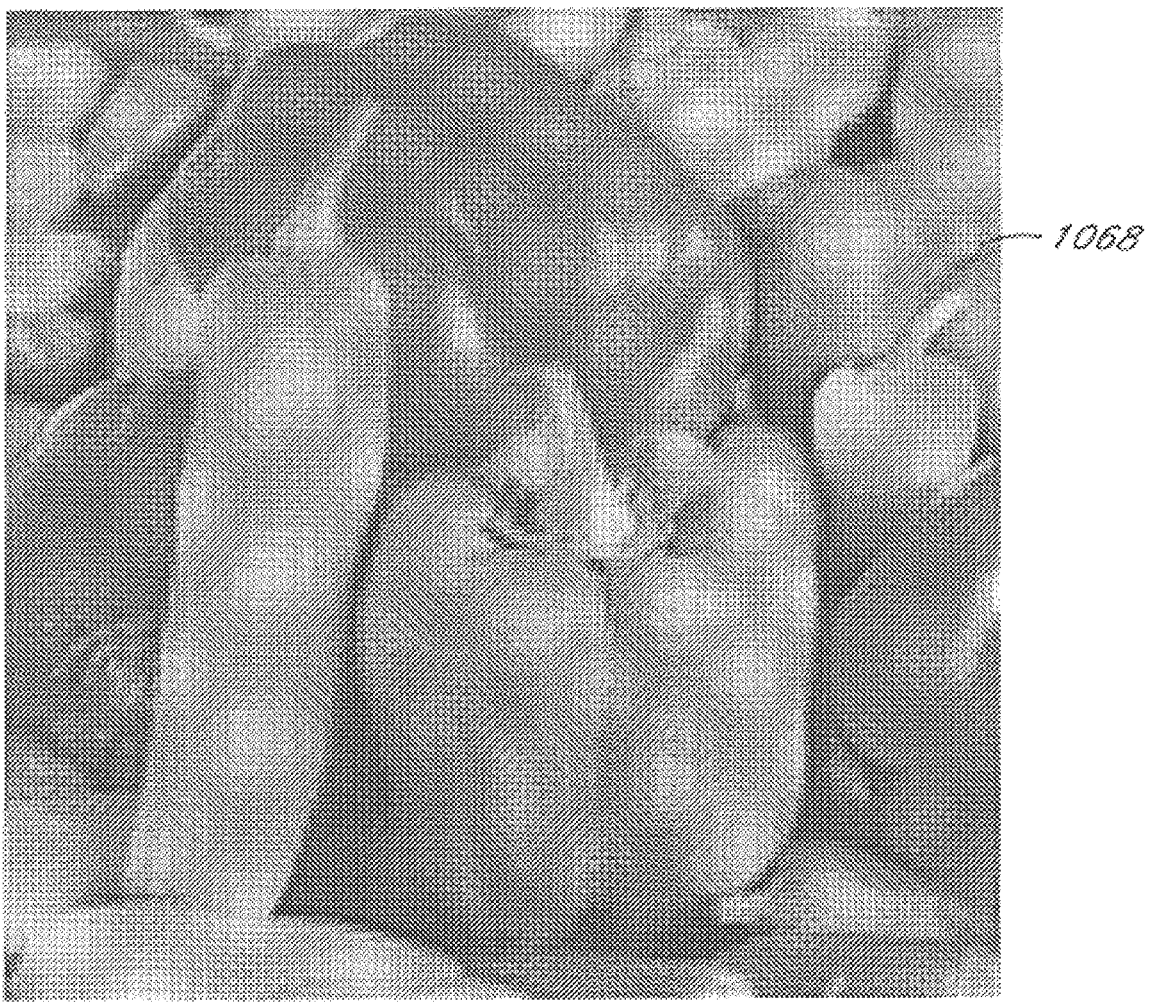
Figure 17A:
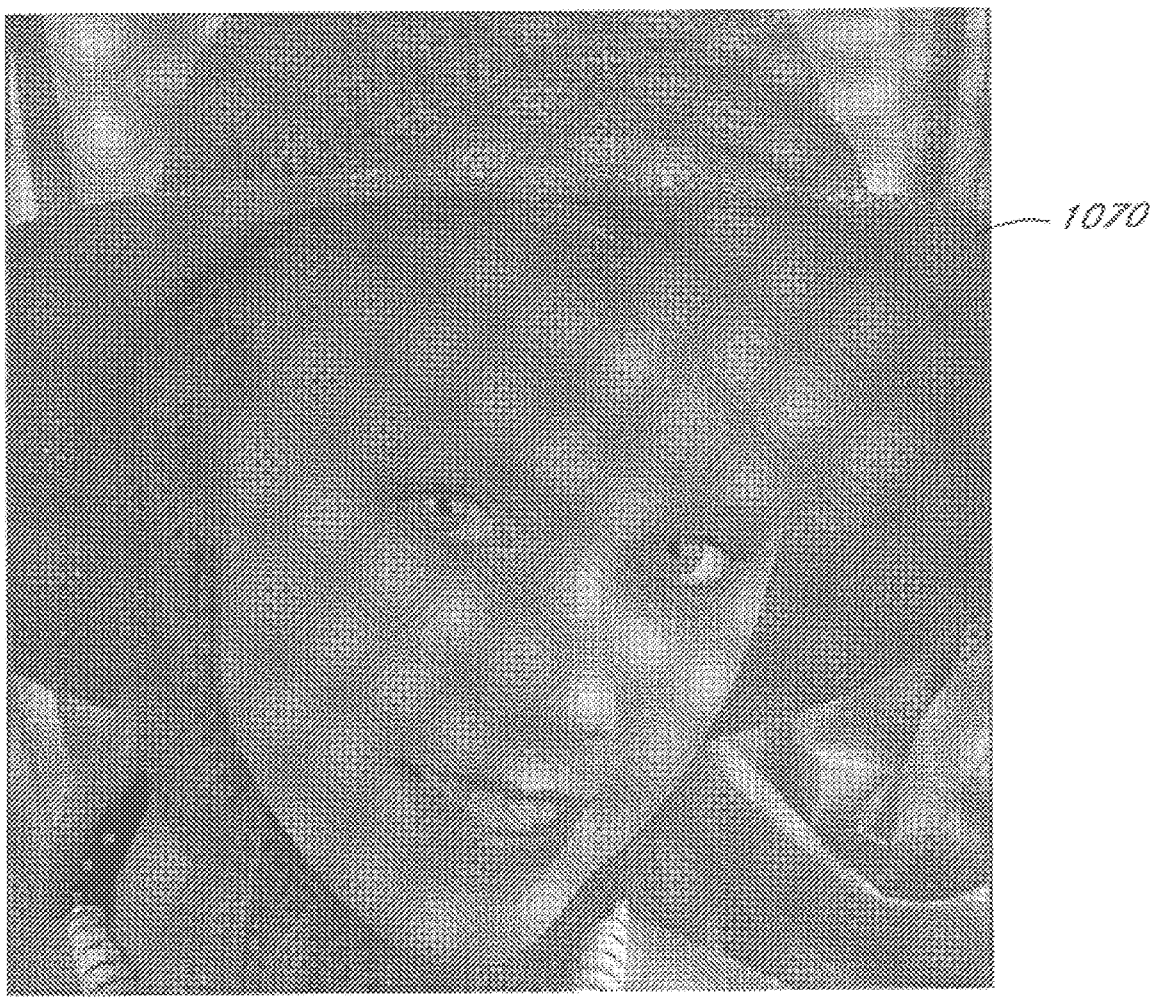
FIGS. 17a–17c are a second two-dimensional image reconstruction for different compression factors.
Figure 17B:
Figure 17C:
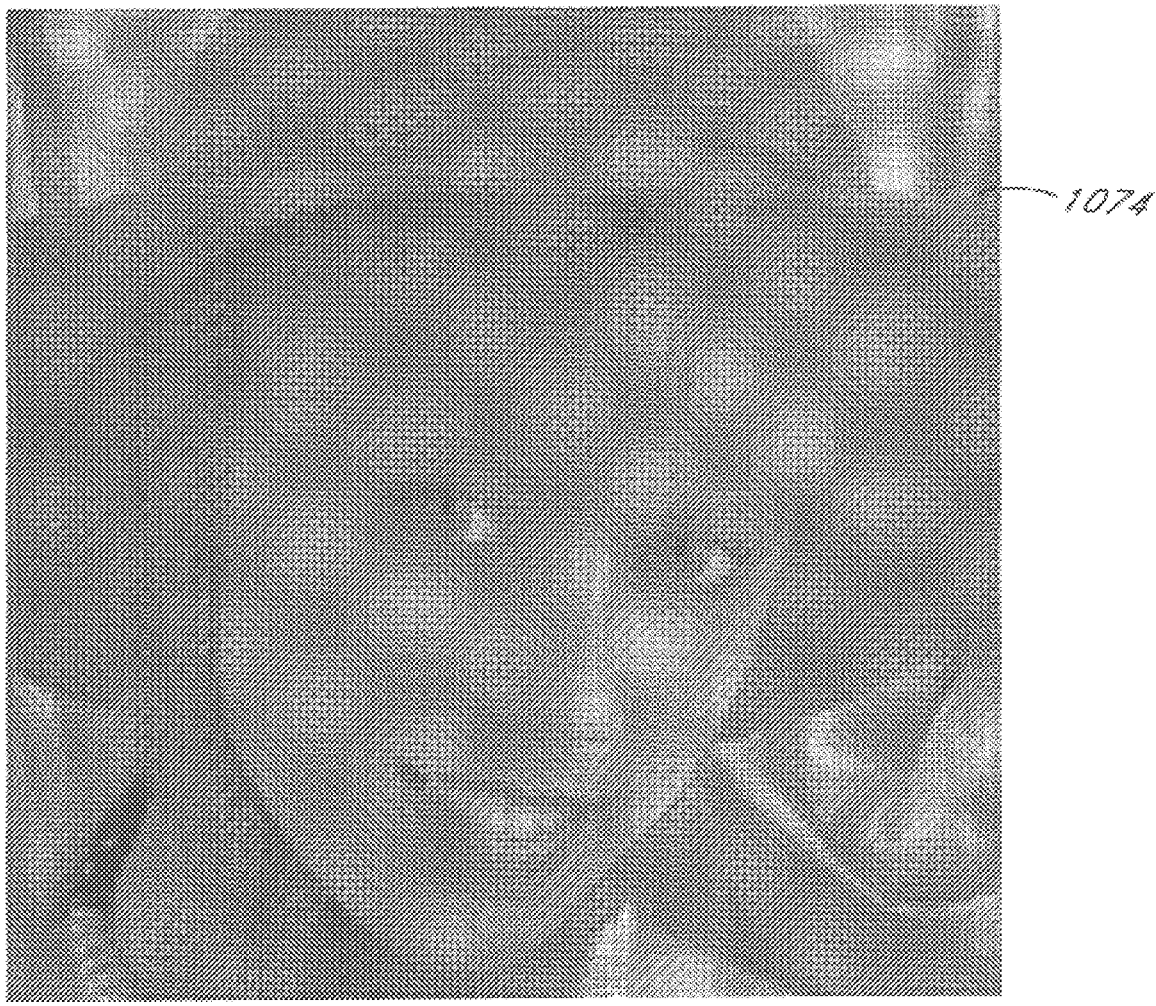
Figure 18:
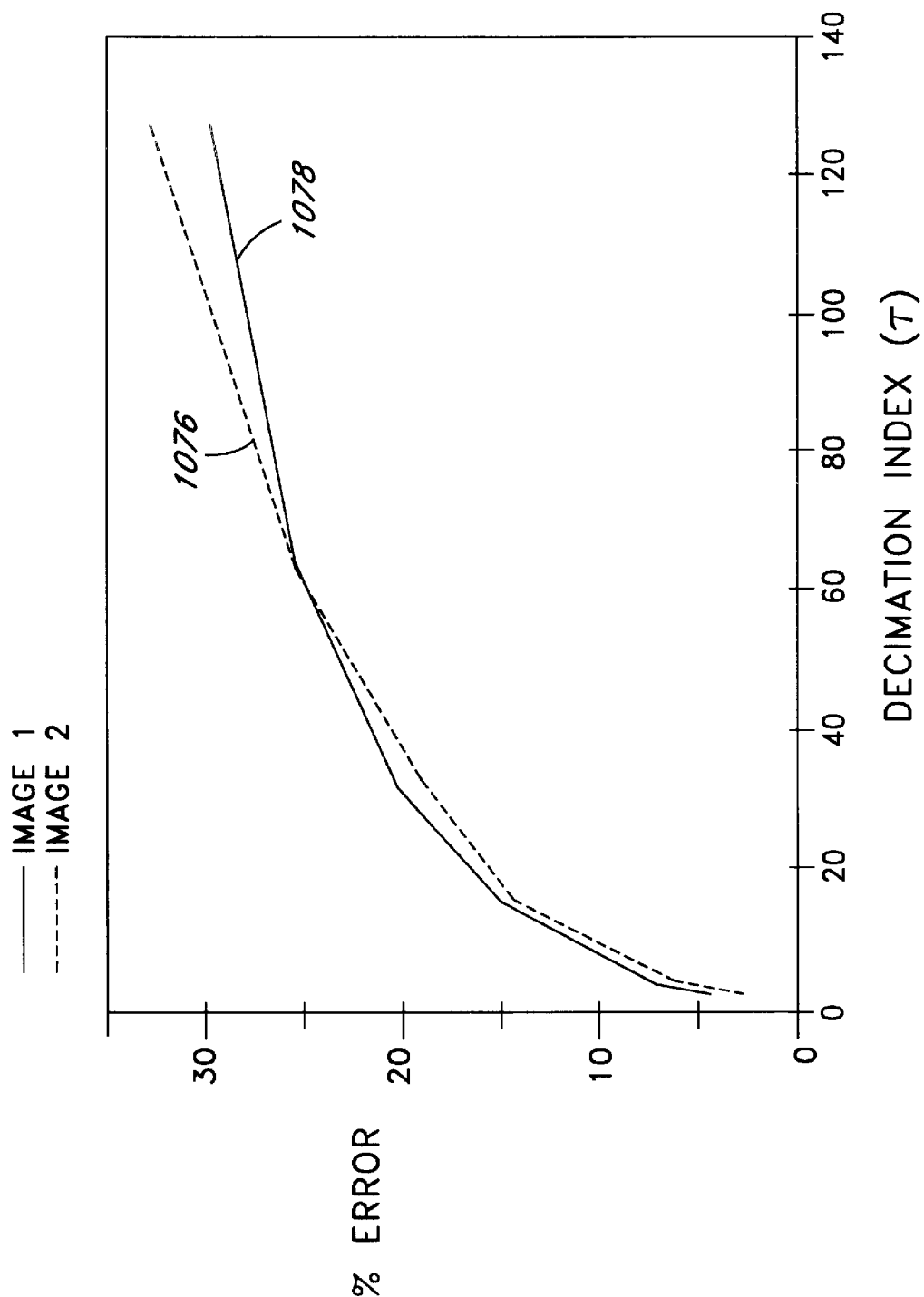
FIG. 18 is plots of standard error for representative images 1 and 2.

For the two-dimensional case, realistic still image data are used as the test. FIGS. 16 and 17 show the original and reconstructed images for $\tau=2$ and $\tau=4$. For $\tau=2$, the reconstructed image 1066, 1072 is substantially similar to the original. However, for $\tau=4$, there are zig-zag patterns along specific edges in images. This is due to the fact that the interpolation less accurately tracks the high frequency components. As described earlier, substantially complete reconstruction is achieved by retaining the minimized residue $\Delta X$ and adding it back to the approximated image. In the next section, several methods are proposed for implementing this process. FIG. 18 shows the error plots as functions of $\tau$ for both images.

Figure 19A:
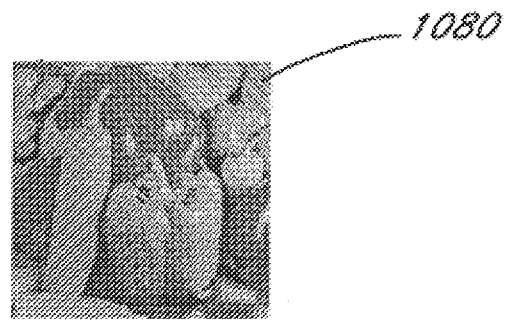
FIGS. 19a–19b are a compressed two- miniature using the optimized decomposition weights.
Figure 19B:
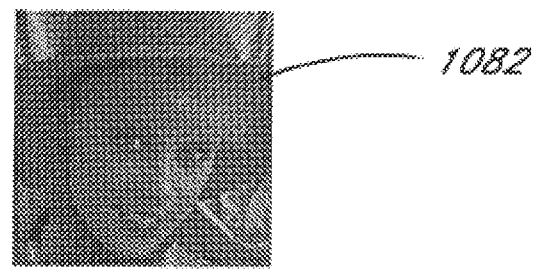

An additional aspect of interest is to look at the optimized weights directly. When these optimal weights are viewed in picture form, high-quality miniatures 1080, 1082 of the original image are obtained, as shown in FIG. 19. Hence, the present embodiment is a very powerful and accurate method for creating a "thumbnail" reproduction of the original image.

V. ALTERNATIVE EMBODIMENTS

Video compression is a major component of high-definition television (HDTV). According to the present invention, video compression is formulated as an equivalent three-dimensional approximation problem, and is amenable to the technique of optimum linear or more generally by hyperplanar spline interpolation. The main advantages of this approach are seen in its fast speed in coding/reconstruction, its suitability in a VLSI hardware implementation, and a variable compression ratio. A principal advantage of the present invention is the versatility with which it is incorporated into other compression systems. The invention can serve as a "frontend" compression platform from which other signal processes are applied. Moreover, the invention can be applied iteratively, in multiple dimensions and in either the image or image conjugate domain. The optimizing method can for example apply to a compressed image and further applied to a corresponding compressed residual image. Due to the inherent low-pass filtering nature of the interpolation process, some edges and other high-frequency features may not be preserved in the reconstructed images, but which are retained through the residue. To address this problem, the following procedures are set forth:

Procedure (a)

Since the theoretical formulation, derivation, and implementation of the disclosed compression method do not depend strongly on the choice of the interpolation kernel function, other kernel functions can be applied and their performances compared. So far, due to its simplicity and excellent performance, only the linear spline function has been applied. Higher-order splines, such as the quadratic spline, cubic spline could also be employed. Aside from the polynomial spline functions, other more complicated function forms can be used.

Procedure (b)

Figure 20:
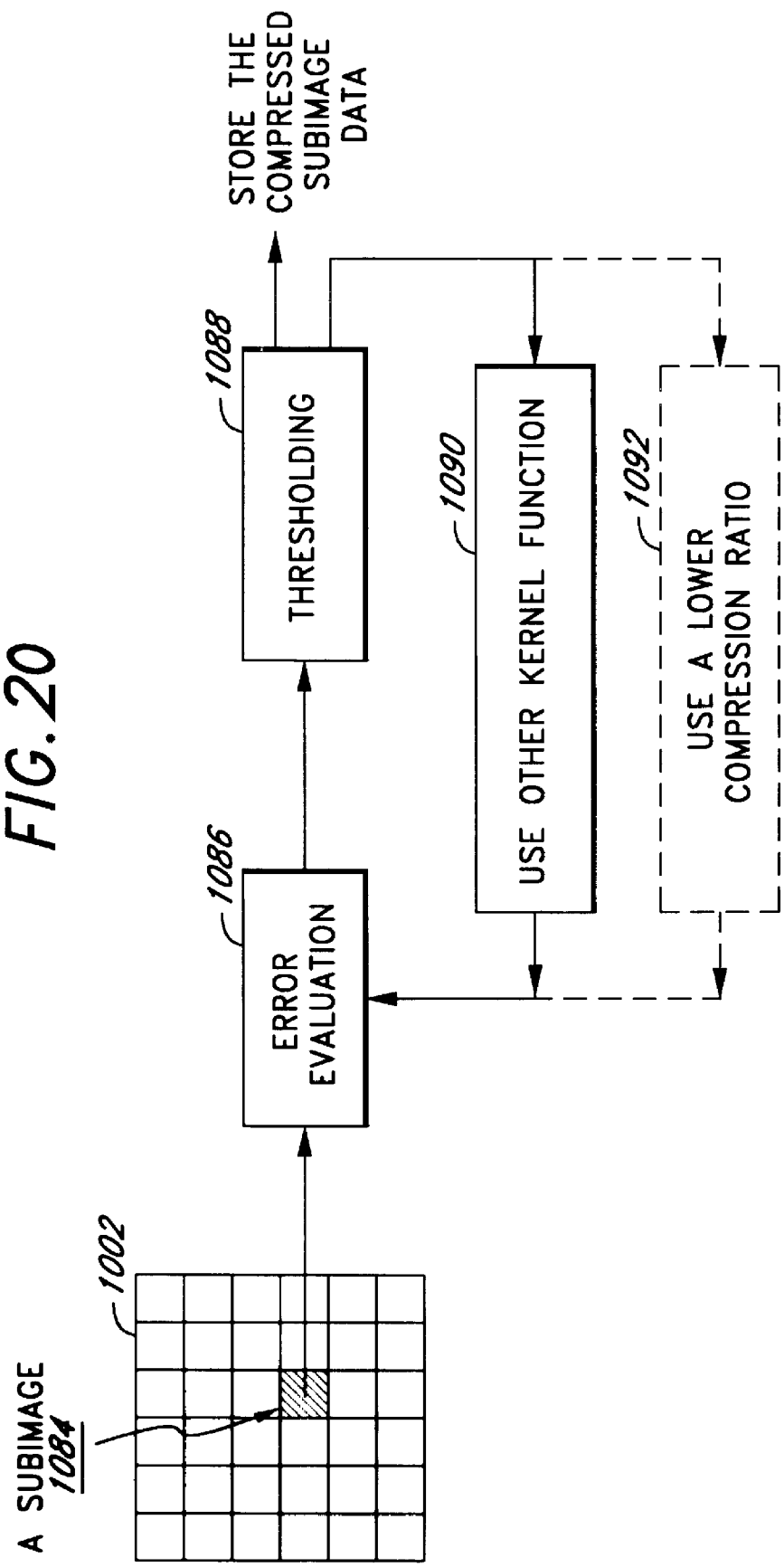
FIG. 20 is a block diagram of a preferred adaptive compression scheme in which the method of the present invention is particularly suited.

Another way to improve the compression method is to apply certain adaptive techniques. FIG. 20 illustrates such an adaptive scheme. For a 2-D image 1002, the whole image can be divided into subimages of smaller size 1084. Since different subimages have different local features and statistics, different compression schemes can be applied to these different subimages. An error criterion is evaluated in a process step 1086. If the error is below a certain threshold determined in a process step 1088, a higher compression ratio is chosen for that subimage. If the error goes above this threshold, then a lower compression ratio is chosen in a step 1092 for that subimage. Both multi-kernel functions 1090 and multi-local-compression ratios provide good adaptive modification.

Procedure (c)

Figure 21:
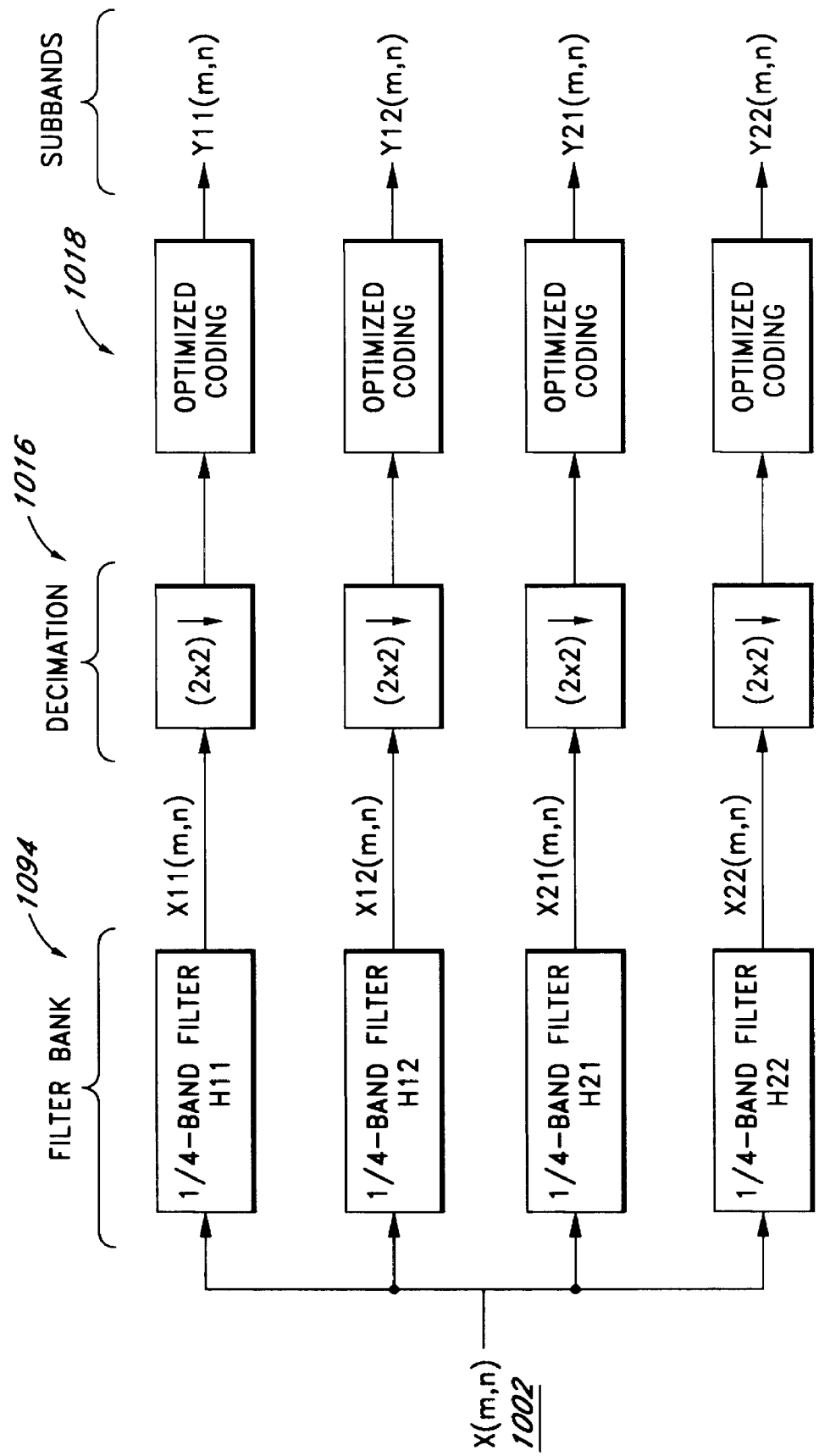
FIG. 21 is a block diagram showing a combined sublevel and optimal-spline compression arrangement.
Figure 22:
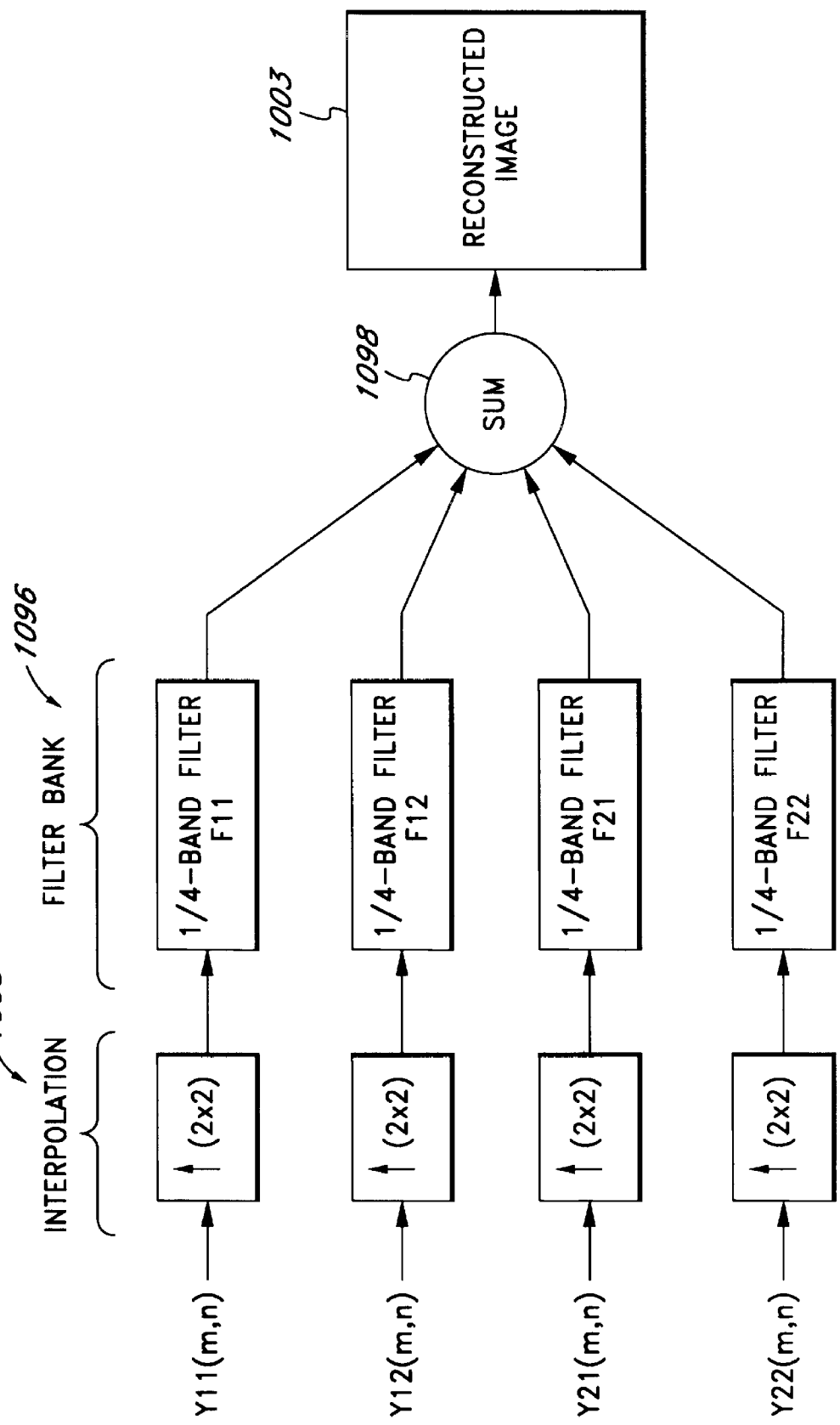
FIG. 22 is a block diagram showing a combined sublevel and optimal-spline reconstruction arrangement.
Figure 23:
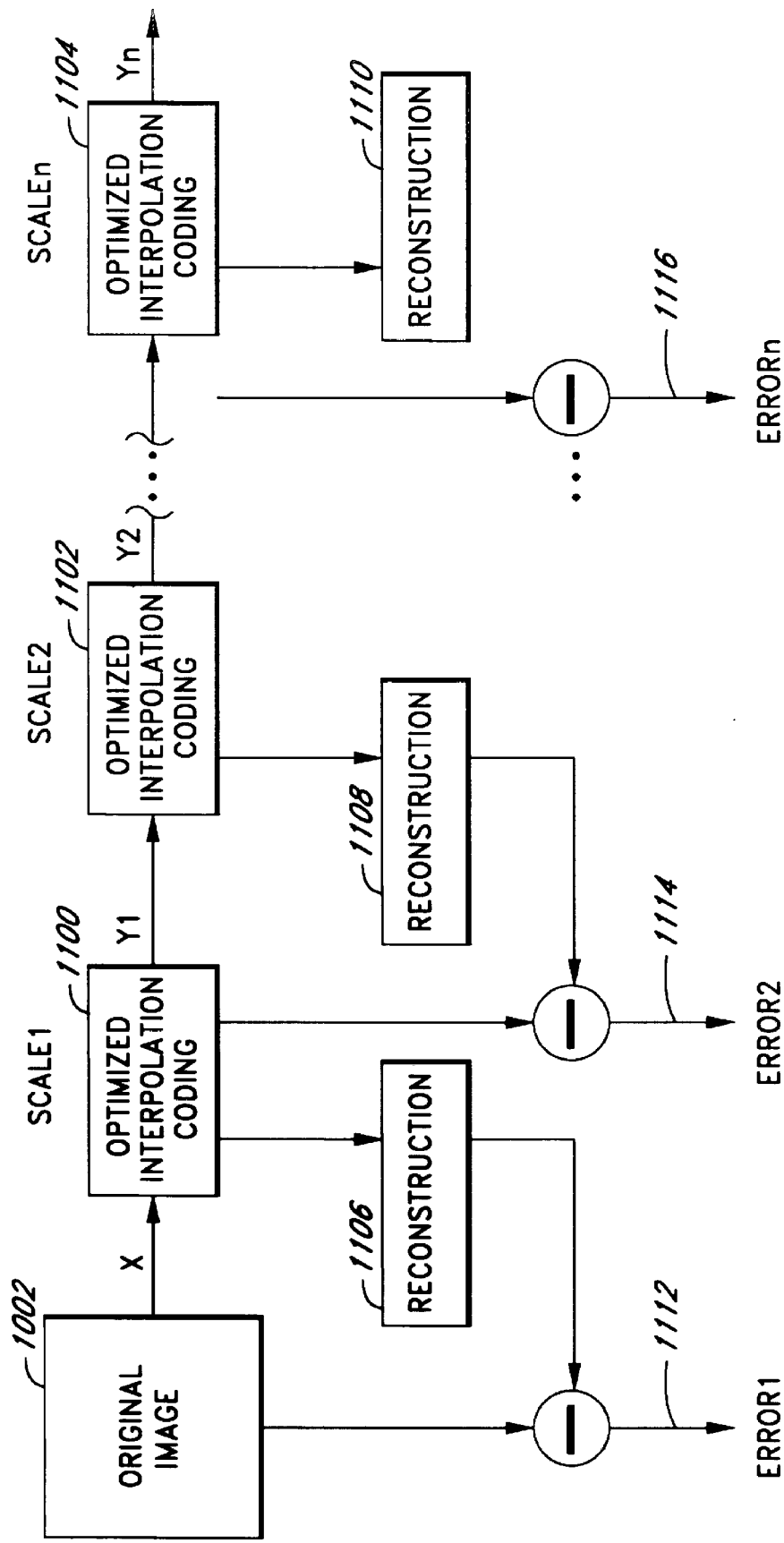
FIG. 23 is a block diagram showing a multi-resolution optimized interpolation arrangement.

Subband coding techniques have been widely used in digital speech coding. Recently, subband coding is also applied to digital image data compression. The basic approach of subband coding is to split the signal into a set of frequency bands, and then to compress each subband with an efficient compression algorithm which matches the statistics of that band. The subband coding techniques divide the whole frequency band into smaller frequency subbands. Then, when these subbands are demodulated into the baseband, the resulting equivalent bandwidths are greatly reduced. Since the subbands have only low frequency components, one can use the above described, linear or planar spline, data compression technique for coding these data. A 16-band filter compression system is shown in FIG. 21, and the corresponding reconstruction system in FIG. 22. There are, of course, many ways to implement this filter bank, as will be appreciated by those skilled in the art. For example, a common method is to exploit the Quadrature Mirror Filter structure.

V. IMAGE DOMAIN IMPLEMENTATION

The embodiments described earlier utilize a spline filter optimization process in the image conjugate domain using an FFT processor or equivalent thereof. The present invention also provides an equivalent image domain implementation of a spline filter optimization process which presents distinct advantages with regard to speed, memory and process application.

Referring back to Equation 45, it will be appreciated that the transform processes DFT and $DFT^{-1}$ may be subsummed into an equivalent conjugate domain convolution, shown here briefly:

$$X_j = DFT\left[\frac{1}{\lambda_m} DFT^{-1}(Y_k)\right] \quad (54)$$

$$= DFT\left[DFT^{-1}\left[DFT\left(\frac{1}{\lambda_m}\right)\right] DFT^{-1}(Y_k)\right]$$

If $\Omega = DFT(1/\lambda_m)$, then:

$$X_j = DFT[DFT^{-1}(\Omega) DFT^{-1}(Y_k)]$$

$$= \Omega * Y_k.$$

Figure 24:
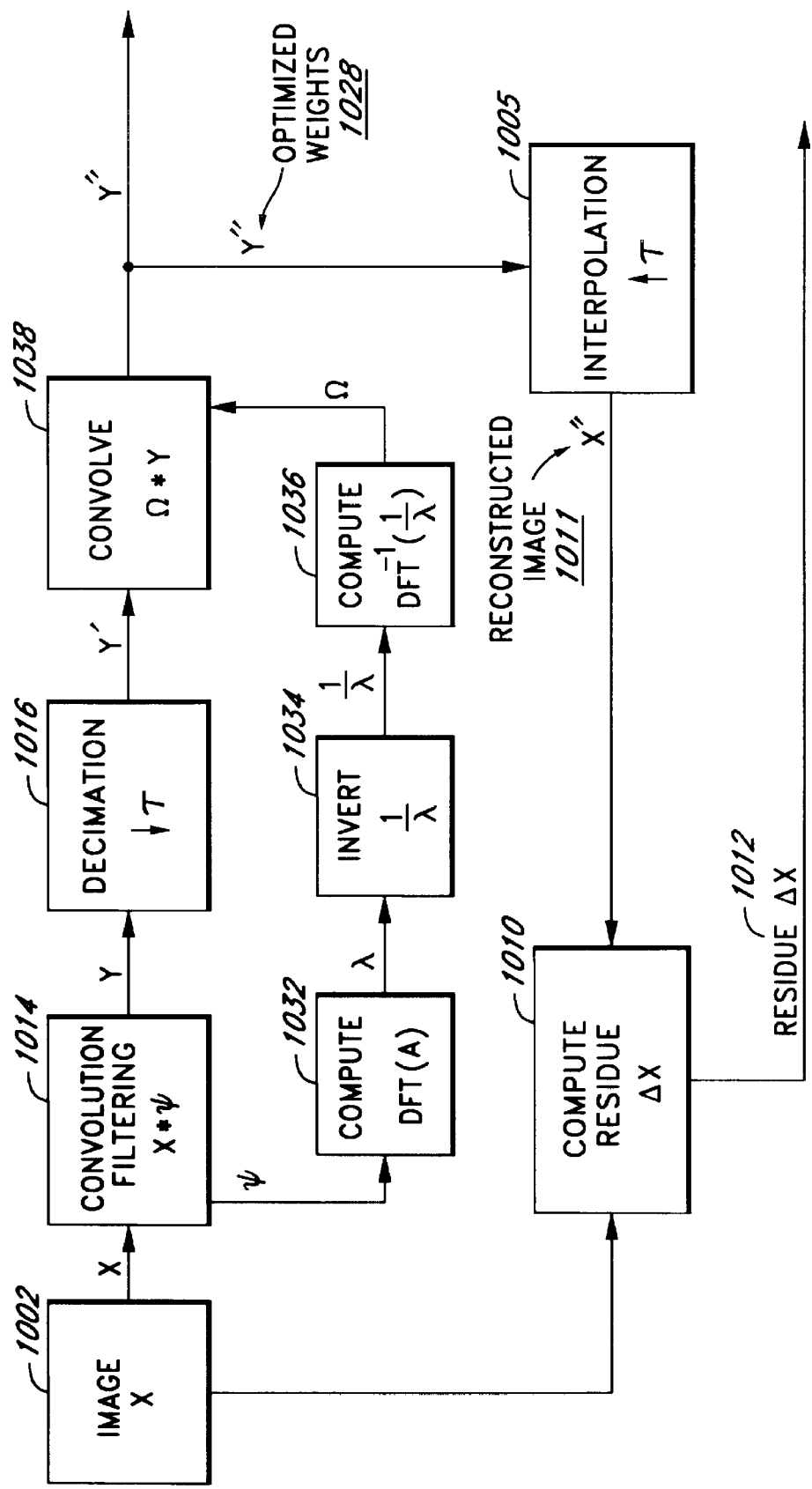
FIG. 24 is a block diagram showing an embodiment of the optimizing process in the image domain.

Furthermore, with $\lambda.m = DFT(a_j)$, the optimization process may be completely carried over to an image domain implementation knowing only the form of the input spline filter function. The transform processes can be performed in advance to generate the image domain equivalent of the inverse eigenfilter. As shown in FIG. 24, the image domain spline optimizer $\Omega$ operates on compressed image data Y' generated by a first convolution process 1014 followed by a decimation process 1016, as previously described. Off-line or perhaps adaptively, the tensor transformation A (as shown for example in Equation 25 above) is supplied to an FFT type processor 1032, which computes the transformation eigenvalues $\lambda$. The tensor of eigenvalues is then inverted at process block 1034, followed by $FFT^{-1}$ process block 1036, generating the image domain tensor $\Omega$. The tensor $\Omega$ is supplied to a second convolution process 1038, whereupon $\Omega$ is convolved with the non-optimized compressed image data Y' to yield optimized compressed image data Y".

In practice, there is a compromise between accuracy and economy with regard to the specific form of $\Omega$. The optimizer tensor $\Omega$ should be of sufficient size for adequate approximation of:

$$DFT^{-1}\left(\frac{1}{DFT(A)}\right).$$

On the other hand, the term $\Omega$ should be small enough to be computationally tractable for the online convolution process 1038. It has been found that two-dimensional image compression using the preferred hexagonal tent spline is adequately optimized by a 5×5 matrix, and preferably a 7×7 matrix, for example, with the following form:

$$\Omega = \begin{Bmatrix} 0 & h & -g & g & e & e & g \\ h & f & e & d & c & d & e \\ -g & e & c & b & b & c & e \\ g & d & b & a & b & d & g \\ e & c & b & b & c & e & -g \\ e & d & c & d & e & f & h \\ g & e & e & g & -g & h & 0 \end{Bmatrix}.$$

Additionally, to reduce computational overhead, the smallest elements (i.e., the elements near the perimeter) such as f, g, and h may be set to zero with little noticeable effect in the reconstruction.

Figure 5:
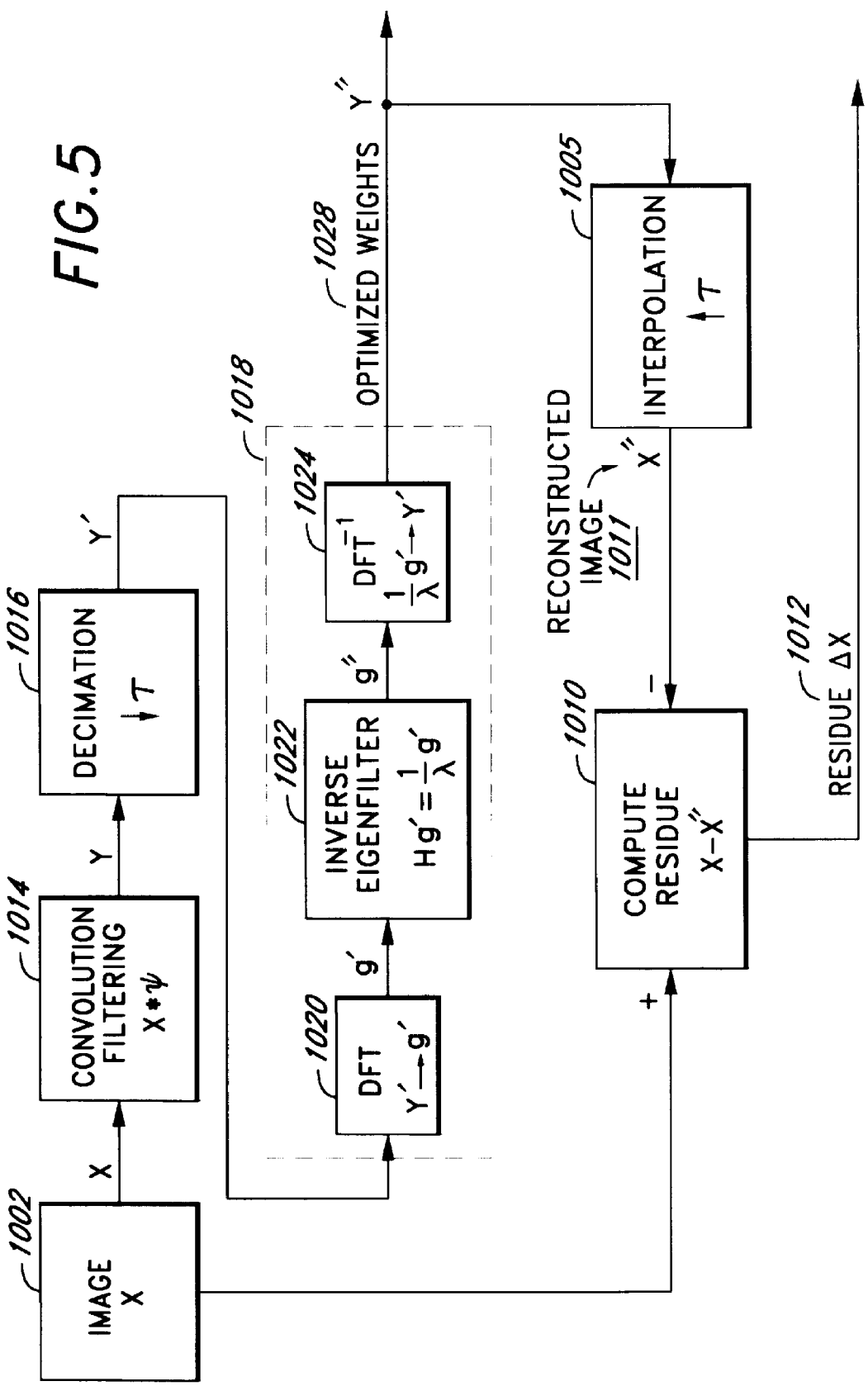
FIG. 5 is a block diagram showing a basic optimization block of the present invention.

The principal advantages of the present preferred embodiment are in computational saving above and beyond that of the previously described conjugate domain inverse eigenfilter process (FIG. 5, 1018). For example, a two-dimensional FFT process may typically require about $N^2 \log_2 N$ complex operations or equivalently $6N^2 \log_2 N$ multiplications. The total number of image conjugate filter operations is of order $10 N^2 \log_2 N$. On the other hand, the presently described (7×7) kernel with 5 distinct operations per image element will require only $5N^2$ operations, lower by an important factor of $\log_2 N$. Hence, even for reasonably small images, there is significant improvement in computation time.

Additionally, there is substantial reduction in buffer demands because the image domain process 1038 requires only a 7×7 image block at a given time, in contrast to the conjugate process which requires a full-frame buffer before processing. In addition to the lower demands on computation with the image domain process 1038, there is virtually no latency in transmission as the process is done in pipeline.

Finally, "power of 2" constraints desirable for efficient FFT processing is eliminated, allowing convenient application to a wider range of image dimensions.

Although the invention has been described in terms of the preferred embodiment, many variations will be apparent to those skilled in the art. All such variations are intended to be included within the appended claims.

What is claimed is:

1. A method of compressing and reconstructing digital data, comprising:

applying spline functions which are doubly periodic hexagonal tent functions having the shape of a six sided pyramid to original digital data to generate compressed digital data;

applying a predetermined error optimizing process to said compressed digital data to generate further compressed digital data; and interpolating said further compressed digital data to generate a reconstructed representation of said original digital data.

2. The method as defined in claim 1, wherein said interpolating step comprises applying said spline functions to said optimized compressed digital data.

3. The method as defined in claim 1, wherein said spline functions are piece-wise linear functions of one dimension.

4. The method as defined in claim 1, wherein said spline functions are piece-wise planar functions of two dimensions.

5. A method of compressing digital data comprising:

applying hexagonal tent function filters, having the shape of a six-sided pyramid, to original digital data to generate compressed digital data; and applying a predetermined error criterion to said compressed digital data to generate substantially optimal compressed digital data.

6. The method as defined in claim 5 further comprising:

interpolating said compressed digital data.

* * * * *